(12) United States Patent
Geer

(10) Patent No.: US 9,551,785 B1
(45) Date of Patent: Jan. 24, 2017

(54) METHOD AND APPARATUS FOR THE DETECTION OF OBJECTS USING ELECTROMAGNETIC WAVE ATTENUATION PATTERNS

(71) Applicant: James L. Geer, Hoover, AL (US)

(72) Inventor: James L. Geer, Hoover, AL (US)

(*) Notice: Subject to any disclaimer, the term of this patent is extended or adjusted under 35 U.S.C. 154(b) by 15 days.

(21) Appl. No.: 14/541,698

(22) Filed: Nov. 14, 2014

Related U.S. Application Data

(63) Continuation of application No. 13/471,648, filed on May 15, 2012, now Pat. No. 8,890,744, which is a
(Continued)

(51) Int. Cl.
  *G01S 13/04* (2006.01)
  *G01S 13/08* (2006.01)
  (Continued)

(52) U.S. Cl.
  CPC .............. *G01S 13/08* (2013.01); *G01S 13/003* (2013.01); *G01S 13/04* (2013.01); *G01S 13/449* (2013.01); *G01S 13/88* (2013.01)

(58) Field of Classification Search
  CPC .............. H04L 27/01; G01S 2013/0236; G01S 2013/029; G01S 13/02; G01S 13/04; G01S 13/06; G01S 13/08; G01S 13/003; G01S 13/42; G01S 13/44; G01S 13/449; G01S 13/0209; G01S 13/10; G01S 13/32; G01S 13/325; G01S 13/46; G01S 13/88; G01S 13/89; G01S 13/34; G01S 13/345; G01S 13/95; G01S 13/951; G01V 1/008; H04B 7/22
  (Continued)

(56) References Cited

U.S. PATENT DOCUMENTS

| | | | | |
|---|---|---|---|---|
| 3,665,466 A | * | 5/1972 | Hibbard | G01S 13/345 |
| | | | | 324/330 |
| 3,715,748 A | * | 2/1973 | Hicks | G01S 13/951 |
| | | | | 342/190 |

(Continued)

FOREIGN PATENT DOCUMENTS

WO   9809381 A1   3/1998

OTHER PUBLICATIONS

Foschini, Luigi. "Is Science going through a critical stage?." arXiv preprint physics/9807009 (1998).
(Continued)

*Primary Examiner* — Bernarr Gregory
(74) *Attorney, Agent, or Firm* — Steven M. Hoffberg, Esq.; Ostrolenk Faber LLP.

(57) ABSTRACT

A method for detecting an object, comprising the steps of defining expected characteristics of scattered electromagnetic radiation to be received at a receiver; attenuating at least a portion of electromagnetic radiation received at the receiver by a presence of an object within a path of electromagnetic information; and detecting the attenuation to indicate a presence of the object. The object may be a low radar profile object, such as a stealth aircraft. The electromagnetic radiation is preferably microwave, but may also be radio frequency or infrared. By using triangulation and other geometric techniques, distance and position of the object may be computed.

20 Claims, 11 Drawing Sheets

PASSIVE (BACKGROUND) DISTANCE DETERMINATION
DISTANCE DETERMINATION WITH COSMIC
BACKGROUND RADIATION

Related U.S. Application Data continuation of application No. 13/093,447, filed on Apr. 25, 2011, now Pat. No. 8,179,299, which is a continuation of application No. 09/545,407, filed on Apr. 7, 2000, now Pat. No. 7,952,511.

(60) Provisional application No. 60/128,233, filed on Apr. 7, 1999.

(51) Int. Cl.
*G01S 13/88* (2006.01)
*G01S 13/00* (2006.01)
*G01S 13/44* (2006.01)

(58) Field of Classification Search
USPC ............ 342/13–22, 26 R–26 D, 27, 28, 59, 118,342/175, 192–197, 128–145; 375/218, 224–236
See application file for complete search history.

(56) References Cited

U.S. PATENT DOCUMENTS

| | | | |
|---|---|---|---|
| 3,725,914 A * | 4/1973 | Davidson | G01S 13/46 342/26 D |
| 3,881,154 A * | 4/1975 | Lewis | H04B 7/22 342/26 R |
| 4,337,376 A | 6/1982 | Gruenberg | |
| 4,530,087 A | 7/1985 | Yamamoto | |
| 4,710,944 A | 12/1987 | Nossen | |
| 4,736,371 A | 4/1988 | Tejima et al. | |
| 4,750,198 A | 6/1988 | Harper | |
| 4,797,879 A | 1/1989 | Habbab et al. | |
| 4,937,580 A * | 6/1990 | Wills | G01S 13/88 342/22 |
| 5,075,863 A * | 12/1991 | Nagamune | G01S 13/325 342/130 |
| 5,134,715 A | 7/1992 | Parl et al. | |
| 5,151,919 A | 9/1992 | Dent | |
| 5,153,595 A * | 10/1992 | Harmuth | G01S 13/10 342/145 |
| 5,159,343 A * | 10/1992 | Harmuth | G01S 13/10 342/145 |
| 5,173,704 A * | 12/1992 | Buehler | G01S 13/003 342/26 D |
| 5,203,018 A | 4/1993 | Hirose | |
| 5,228,025 A | 7/1993 | Le Floch et al. | |
| 5,239,677 A | 8/1993 | Jasinski | |
| 5,241,544 A | 8/1993 | Jasper et al. | |
| 5,260,968 A | 11/1993 | Gardner et al. | |
| 5,289,499 A | 2/1994 | Weerackody | |
| 5,295,159 A | 3/1994 | Kerpez | |
| 5,315,584 A | 5/1994 | Savary et al. | |
| 5,325,095 A * | 6/1994 | Vadnais | G01S 13/0209 342/22 |
| 5,345,599 A | 9/1994 | Paulraj et al. | |
| 5,404,355 A | 4/1995 | Raith | |
| 5,422,733 A | 6/1995 | Merchant et al. | |
| 5,442,625 A | 8/1995 | Gitlin et al. | |
| 5,448,602 A | 9/1995 | Ohmori et al. | |
| 5,469,465 A | 11/1995 | Birchler et al. | |
| 5,471,647 A | 11/1995 | Gerlach et al. | |
| 5,479,444 A | 12/1995 | Malkamaki et al. | |
| 5,479,447 A | 12/1995 | Chow et al. | |
| 5,481,570 A | 1/1996 | Winters | |
| 5,491,837 A | 2/1996 | Haartsen | |
| 5,493,712 A | 2/1996 | Ramesh et al. | |
| 5,506,861 A | 4/1996 | Bottomley | |
| 5,509,003 A | 4/1996 | Snijders et al. | |
| 5,510,779 A | 4/1996 | Maltby et al. | |
| 5,515,378 A | 5/1996 | Roy, III et al. | |
| 5,528,581 A | 6/1996 | De Bot | |
| 5,534,868 A * | 7/1996 | Gjessing | G01S 13/951 342/26 D |
| 5,537,435 A | 7/1996 | Carney et al. | |
| 5,548,819 A | 8/1996 | Robb | |
| 5,566,209 A | 10/1996 | Forssen et al. | |
| 5,579,304 A | 11/1996 | Sugimoto et al. | |
| 5,592,490 A | 1/1997 | Barratt et al. | |
| 5,606,729 A | 2/1997 | D'Amico et al. | |
| 5,634,199 A | 5/1997 | Gerlach et al. | |
| 5,638,369 A | 6/1997 | Ayerst et al. | |
| 5,642,353 A | 6/1997 | Roy, III et al. | |
| 5,649,287 A | 7/1997 | Forssen et al. | |
| 5,677,909 A | 10/1997 | Heide | |
| 5,691,727 A | 11/1997 | Cyzs | |
| 5,694,129 A * | 12/1997 | Fujinawa | G01V 1/008 342/22 |
| 5,729,542 A | 3/1998 | Dupont | |
| 5,752,173 A | 5/1998 | Tsujimoto | |
| 5,787,122 A | 7/1998 | Suzuki | |
| 5,790,550 A | 8/1998 | Peeters et al. | |
| 5,796,775 A | 8/1998 | Aoyama | |
| 5,809,019 A | 9/1998 | Ichihara et al. | |
| 5,818,813 A | 10/1998 | Saito et al. | |
| 5,822,374 A | 10/1998 | Levin | |
| 5,831,977 A | 11/1998 | Dent | |
| 5,832,044 A | 11/1998 | Sousa et al. | |
| 5,832,387 A | 11/1998 | Bae et al. | |
| 5,859,875 A | 1/1999 | Kato et al. | |
| 5,867,478 A | 2/1999 | Baum et al. | |
| 5,867,539 A | 2/1999 | Koslov | |
| 5,883,887 A | 3/1999 | Take et al. | |
| 5,886,988 A | 3/1999 | Yun et al. | |
| 5,889,826 A | 3/1999 | Takahashi | |
| 5,905,721 A | 5/1999 | Liu et al. | |
| 5,920,285 A * | 7/1999 | Benjamin | G01S 13/89 342/22 |
| 5,959,965 A | 9/1999 | Ohkubo et al. | |
| 5,960,039 A | 9/1999 | Martin et al. | |
| 5,966,094 A | 10/1999 | Ward et al. | |
| 5,973,638 A | 10/1999 | Robbins et al. | |
| 5,982,327 A | 11/1999 | Vook et al. | |
| 6,005,876 A | 12/1999 | Cimini, Jr. et al. | |
| 6,011,963 A | 1/2000 | Ogoro | |
| 6,049,548 A | 4/2000 | Bruno et al. | |
| 6,058,105 A | 5/2000 | Hochwald et al. | |
| 6,067,290 A | 5/2000 | Paulraj et al. | |
| 6,072,779 A | 6/2000 | Tzannes et al. | |
| 6,084,915 A | 7/2000 | Williams | |
| 6,097,771 A | 8/2000 | Foschini | |
| 6,115,354 A | 9/2000 | Weck | |
| 6,115,427 A | 9/2000 | Calderbank et al. | |
| 6,122,247 A | 9/2000 | Levin et al. | |
| 6,131,016 A | 10/2000 | Greenstein et al. | |
| 6,141,388 A | 10/2000 | Servais et al. | |
| 6,141,542 A | 10/2000 | Kotzin et al. | |
| 6,141,567 A | 10/2000 | Youssefmir et al. | |
| 6,144,711 A | 11/2000 | Raleigh et al. | |
| 6,154,661 A | 11/2000 | Goldburg | |
| 6,163,296 A | 12/2000 | Lier et al. | |
| 6,167,031 A | 12/2000 | Olofsson et al. | |
| 6,175,588 B1 | 1/2001 | Visotsky et al. | |
| 6,178,196 B1 | 1/2001 | Naguib et al. | |
| 6,192,256 B1 | 2/2001 | Whinnett | |
| 6,205,410 B1 | 3/2001 | Cai | |
| 6,219,341 B1 | 4/2001 | Varanasi | |
| 6,222,888 B1 | 4/2001 | Kao et al. | |
| 6,232,918 B1 | 5/2001 | Wax et al. | |
| 6,266,528 B1 | 7/2001 | Farzaneh | |
| 6,275,543 B1 | 8/2001 | Petrus et al. | |
| 6,278,726 B1 | 8/2001 | Mesecher et al. | |
| 6,292,917 B1 | 9/2001 | Sinha et al. | |
| 6,298,035 B1 | 10/2001 | Heiskala | |
| 6,298,092 B1 | 10/2001 | Heath, Jr. et al. | |
| 6,308,080 B1 | 10/2001 | Burt et al. | |
| 6,314,113 B1 | 11/2001 | Guemas | |
| 6,314,147 B1 | 11/2001 | Liang et al. | |
| 6,314,289 B1 | 11/2001 | Eberlein et al. | |
| 6,317,612 B1 | 11/2001 | Farsakh | |
| 6,320,113 B1 | 11/2001 | Griffin et al. | |
| 6,330,277 B1 | 12/2001 | Gelbum et al. | |
| 6,330,293 B1 | 12/2001 | Klank et al. | |

(56) References Cited

U.S. PATENT DOCUMENTS

| | | |
|---|---|---|
| 6,330,462 B1 | 12/2001 | Chen |
| 6,333,953 B1 | 12/2001 | Bottomley et al. |
| 6,339,399 B1 | 1/2002 | Andersson et al. |
| 6,345,036 B1 | 2/2002 | Sudo et al. |
| 6,346,910 B1 | 2/2002 | Ito |
| 6,347,234 B1 | 2/2002 | Scherzer |
| 6,348,036 B1 | 2/2002 | Looney et al. |
| 6,351,499 B1 | 2/2002 | Paulraj et al. |
| 6,362,781 B1 | 3/2002 | Thomas et al. |
| 6,363,267 B1 | 3/2002 | Lindskog et al. |
| 6,369,758 B1 | 4/2002 | Zhang |
| 6,377,631 B1 | 4/2002 | Raleigh |
| 6,377,632 B1 | 4/2002 | Paulraj et al. |
| 6,377,636 B1 | 4/2002 | Paulraj et al. |
| 6,377,812 B1 | 4/2002 | Rashid-Farrokhi et al. |
| 6,377,819 B1 | 4/2002 | Gesbert et al. |
| 6,380,910 B1 | 4/2002 | Moustakas et al. |
| 6,385,264 B1 | 5/2002 | Terasawa et al. |
| 6,396,885 B1 | 5/2002 | Ding et al. |
| 6,400,699 B1 | 6/2002 | Airy et al. |
| 6,426,971 B1 | 7/2002 | Wu et al. |
| 6,442,214 B1 | 8/2002 | Boleskei et al. |
| 6,445,342 B1 | 9/2002 | Thomas et al. |
| 6,452,981 B1 | 9/2002 | Raleigh et al. |
| 6,463,290 B1 | 10/2002 | Stilp et al. |
| 6,473,393 B1 | 10/2002 | Ariyavisitakul et al. |
| 6,473,467 B1 | 10/2002 | Wallace et al. |
| 6,477,207 B1 | 11/2002 | Lindholm |
| 6,477,210 B2 | 11/2002 | Chuang et al. |
| 6,478,422 B1 | 11/2002 | Hansen |
| 6,492,942 B1 | 12/2002 | Kezys |
| 6,493,399 B1 | 12/2002 | Xia et al. |
| 6,504,506 B1 | 1/2003 | Thomas et al. |
| 6,542,556 B1 | 4/2003 | Kuchi et al. |
| 6,556,173 B1 | 4/2003 | Moustakas et al. |
| 6,567,387 B1 | 5/2003 | Dulin et al. |
| 6,584,147 B1 | 6/2003 | Schaumont et al. |
| 6,587,526 B1 | 7/2003 | Li et al. |
| 6,603,806 B2 | 8/2003 | Martone |
| 6,608,859 B2 | 8/2003 | De et al. |
| 6,614,861 B1 | 9/2003 | Terry et al. |
| 6,618,454 B1 | 9/2003 | Agrawal et al. |
| 6,625,203 B2 | 9/2003 | De et al. |
| 6,636,568 B2 | 10/2003 | Kadous |
| 6,647,015 B2 | 11/2003 | Malkemes et al. |
| 6,647,078 B1 | 11/2003 | Thomas et al. |
| 6,650,653 B1 | 11/2003 | Horng et al. |
| 6,654,429 B1 | 11/2003 | Li |
| 6,661,856 B1 | 12/2003 | Calderbank et al. |
| 6,662,024 B2 | 12/2003 | Walton et al. |
| 6,678,253 B1 | 1/2004 | Heath, Jr. et al. |
| 6,683,916 B1 | 1/2004 | Sartoni et al. |
| 6,686,879 B2 | 2/2004 | Shattil |
| 6,687,492 B1 | 2/2004 | Sugar et al. |
| 6,690,680 B1 | 2/2004 | Marchok et al. |
| 6,701,129 B1 | 3/2004 | Hashem et al. |
| 6,711,412 B1 | 3/2004 | Tellado et al. |
| 6,721,367 B1 | 4/2004 | Miya et al. |
| 6,721,569 B1 | 4/2004 | Hashem et al. |
| 6,741,635 B2 | 5/2004 | Lo et al. |
| 6,751,187 B2 | 6/2004 | Walton et al. |
| 6,751,261 B1 | 6/2004 | Olsson et al. |
| 6,757,265 B1 | 6/2004 | Sebastian et al. |
| 6,757,321 B2 | 6/2004 | Pan et al. |
| 6,757,322 B2 | 6/2004 | Schilling |
| 6,757,337 B2 | 6/2004 | Zhuang et al. |
| 6,760,388 B2 | 7/2004 | Ketchum et al. |
| 6,760,882 B1 | 7/2004 | Gesbert et al. |
| 6,771,706 B2 | 8/2004 | Ling et al. |
| 6,775,329 B2 | 8/2004 | Alamouti et al. |
| 6,782,257 B1 | 8/2004 | Moustakas et al. |
| 6,785,341 B2 | 8/2004 | Walton et al. |
| 6,785,520 B2 | 8/2004 | Sugar et al. |
| 6,795,392 B1 | 9/2004 | Li et al. |
| 6,801,580 B2 | 10/2004 | Kadous |
| 6,807,240 B2 | 10/2004 | Alamouti et al. |
| 6,816,470 B2 | 11/2004 | Kim et al. |
| 6,826,240 B1 | 11/2004 | Thomas et al. |
| 6,834,043 B1 | 12/2004 | Vook et al. |
| 6,834,079 B1 | 12/2004 | Strait et al. |
| 6,839,335 B1 | 1/2005 | Sudo |
| 6,842,487 B1 | 1/2005 | Larsson |
| 6,850,481 B2 | 2/2005 | Wu et al. |
| 6,850,498 B2 | 2/2005 | Heath et al. |
| 6,850,741 B2 | 2/2005 | Lei et al. |
| 6,853,688 B2 | 2/2005 | Alamouti et al. |
| 6,859,503 B2 | 2/2005 | Pautler et al. |
| 6,862,271 B2 | 3/2005 | Medvedev et al. |
| 6,862,272 B2 | 3/2005 | Dulin et al. |
| 6,865,237 B1 | 3/2005 | Boariu et al. |
| 6,868,109 B2 | 3/2005 | Kohno et al. |
| 6,870,515 B2 | 3/2005 | Kitchener et al. |
| 6,873,651 B2 | 3/2005 | Tesfai et al. |
| 6,888,809 B1 | 5/2005 | Foschini et al. |
| 6,888,899 B2 | 5/2005 | Raleigh et al. |
| 6,891,897 B1 | 5/2005 | Bevan et al. |
| 6,898,418 B2 | 5/2005 | Rauschmayer |
| 6,912,195 B2 | 6/2005 | Vook et al. |
| 6,917,820 B2 | 7/2005 | Gore et al. |
| 6,917,821 B2 | 7/2005 | Kadous et al. |
| 6,922,445 B1 | 7/2005 | Sampath et al. |
| 6,925,258 B2 | 8/2005 | Lo |
| 6,927,728 B2 | 8/2005 | Vook et al. |
| 6,928,062 B2 | 8/2005 | Krishnan et al. |
| 6,934,320 B2 | 8/2005 | Tujkovic et al. |
| 6,937,592 B1 | 8/2005 | Heath, Jr. et al. |
| 6,937,665 B1 | 8/2005 | Vandenameele |
| 6,937,843 B2 | 8/2005 | Foschini et al. |
| 6,947,507 B2 | 9/2005 | Kelkar et al. |
| 6,954,655 B2 | 10/2005 | Rudrapatna et al. |
| 6,956,907 B2 | 10/2005 | Ketchum |
| 6,963,619 B1 | 11/2005 | Gesbert et al. |
| 6,965,762 B2 | 11/2005 | Sugar et al. |
| 6,975,666 B2 | 12/2005 | Affes et al. |
| 6,980,600 B1 | 12/2005 | Ratnarajah |
| 6,987,819 B2 | 1/2006 | Thomas et al. |
| 6,993,293 B1 | 1/2006 | Bevan et al. |
| 6,993,299 B2 | 1/2006 | Sugar et al. |
| 6,996,195 B2 | 2/2006 | Kadous |
| 6,996,197 B2 | 2/2006 | Thomas et al. |
| 6,999,724 B2 | 2/2006 | Chizhik et al. |
| 7,002,900 B2 | 2/2006 | Walton et al. |
| 7,006,041 B2 | 2/2006 | Fujii et al. |
| 7,006,579 B2 | 2/2006 | Kuchi et al. |
| 7,006,804 B1 | 2/2006 | Clark et al. |
| 7,006,810 B1 | 2/2006 | Winters et al. |
| 7,006,848 B2 | 2/2006 | Ling et al. |
| 7,010,053 B2 | 3/2006 | El-Gamal et al. |
| 7,010,054 B2 | 3/2006 | El-Gamal et al. |
| 7,012,978 B2 | 3/2006 | Talwar |
| 7,020,072 B1 | 3/2006 | Li et al. |
| 7,020,110 B2 | 3/2006 | Walton et al. |
| 7,020,446 B2 | 3/2006 | Mehta et al. |
| 7,027,523 B2 | 4/2006 | Jalali et al. |
| 7,027,533 B2 | 4/2006 | Abe et al. |
| 7,031,371 B1 | 4/2006 | Lakkis |
| 7,031,419 B2 | 4/2006 | Piirainen |
| 7,031,669 B2 | 4/2006 | Vaidyanathan et al. |
| 7,031,753 B2 | 4/2006 | Hashem et al. |
| 7,035,201 B2 | 4/2006 | Fu et al. |
| 7,035,672 B2 | 4/2006 | Nakaya et al. |
| 7,039,370 B2 | 5/2006 | Laroia et al. |
| 7,042,857 B2 | 5/2006 | Krishnan et al. |
| 7,042,858 B1 | 5/2006 | Ma et al. |
| 7,042,956 B2 | 5/2006 | El-Gamal et al. |
| 7,046,651 B2 | 5/2006 | Terry |
| 7,047,016 B2 | 5/2006 | Walton et al. |
| 7,050,510 B2 | 5/2006 | Foschini et al. |
| 7,054,378 B2 | 5/2006 | Walton et al. |
| 7,058,146 B2 | 6/2006 | Paulraj et al. |
| 7,058,367 B1 | 6/2006 | Luo et al. |
| 7,061,854 B2 | 6/2006 | Tarokh et al. |
| 7,065,144 B2 | 6/2006 | Walton et al. |
| 7,068,628 B2 | 6/2006 | Li et al. |

(56) References Cited

U.S. PATENT DOCUMENTS

| | | |
|---|---|---|
| 7,068,705 B2 | 6/2006 | Schilling |
| 7,072,413 B2 | 7/2006 | Walton et al. |
| 7,072,693 B2 | 7/2006 | Farlow et al. |
| 7,076,263 B2 | 7/2006 | Medvedev et al. |
| 7,079,870 B2 | 7/2006 | Vaidyanathan |
| 7,082,159 B2 | 7/2006 | Larsson |
| 7,088,782 B2 | 8/2006 | Mody et al. |
| 7,092,436 B2 | 8/2006 | Ma et al. |
| 7,092,450 B1 | 8/2006 | Al-Dhahir |
| 7,095,709 B2 | 8/2006 | Walton et al. |
| 7,095,790 B2 | 8/2006 | Krishnan et al. |
| 7,095,812 B2 | 8/2006 | Chan et al. |
| 7,099,413 B2 | 8/2006 | Chuang et al. |
| 7,099,678 B2 | 8/2006 | Vaidyanathan |
| 7,099,698 B2 | 8/2006 | Tarokh et al. |
| 7,103,325 B1 | 9/2006 | Jia et al. |
| 7,106,802 B1 | 9/2006 | Heiskala et al. |
| 7,106,816 B2 | 9/2006 | Filipovic |
| 7,110,350 B2 | 9/2006 | Li et al. |
| 7,110,464 B2 | 9/2006 | El-Gamal et al. |
| 7,113,808 B2 | 9/2006 | Hwang et al. |
| 7,116,722 B2 | 10/2006 | Foschini et al. |
| 7,116,725 B2 | 10/2006 | Ketchum et al. |
| 7,120,199 B2 | 10/2006 | Thielecke et al. |
| 7,120,201 B2 | 10/2006 | Huang et al. |
| 7,120,395 B2 | 10/2006 | Tong et al. |
| 7,123,669 B2 | 10/2006 | Ye et al. |
| 7,126,996 B2 | 10/2006 | Classon et al. |
| 7,130,353 B2 | 10/2006 | Brunel |
| 7,130,355 B1 | 10/2006 | Al-Dhahir et al. |
| 7,133,459 B2 | 11/2006 | Onggosanusi et al. |
| 7,133,461 B2 | 11/2006 | Thomas et al. |
| 7,133,646 B1 | 11/2006 | Miao |
| 7,136,410 B2 | 11/2006 | Choi et al. |
| 7,136,437 B2 | 11/2006 | Benesty et al. |
| 7,139,321 B2 | 11/2006 | Giannakis et al. |
| 7,139,328 B2 | 11/2006 | Thomas et al. |
| 7,139,527 B2 | 11/2006 | Tamaki et al. |
| 7,139,964 B2 | 11/2006 | Shen et al. |
| 7,142,864 B2 | 11/2006 | Laroia et al. |
| 7,145,971 B2 | 12/2006 | Raleigh et al. |
| 7,148,845 B2 | 12/2006 | Rooyen et al. |
| 7,149,254 B2 | 12/2006 | Sampath |
| 7,154,960 B2 | 12/2006 | Liu et al. |
| 7,155,171 B2 | 12/2006 | Ebert et al. |
| 7,167,684 B2 | 1/2007 | Kadous et al. |
| 7,173,973 B2 | 2/2007 | Borran et al. |
| 7,177,365 B2 | 2/2007 | El-Gamal et al. |
| 7,184,713 B2 | 2/2007 | Kadous et al. |
| 7,190,734 B2 | 3/2007 | Giannakis et al. |
| 7,194,042 B2 | 3/2007 | Walton et al. |
| 7,194,237 B2 | 3/2007 | Sugar et al. |
| 7,197,282 B2 | 3/2007 | Dent et al. |
| 7,203,249 B2 | 4/2007 | Raleigh et al. |
| 7,203,490 B2 | 4/2007 | Karabinis et al. |
| 7,209,522 B1 | 4/2007 | Shirali |
| 7,212,579 B2 | 5/2007 | Claussen et al. |
| 7,215,704 B2 | 5/2007 | Fujii et al. |
| 7,218,683 B2 | 5/2007 | Ko et al. |
| 7,230,991 B2 | 6/2007 | Sang et al. |
| 7,233,634 B1 | 6/2007 | Hassell Sweatman et al. |
| 7,236,536 B2 | 6/2007 | Hochwald et al. |
| 7,236,539 B2 | 6/2007 | Deng et al. |
| 7,236,750 B2 | 6/2007 | Vaidyanathan et al. |
| 7,242,720 B2 | 7/2007 | Sugiyama et al. |
| 7,242,727 B2 | 7/2007 | Liu et al. |
| 7,245,679 B2 | 7/2007 | Aoki et al. |
| 7,245,881 B2 | 7/2007 | Sugar et al. |
| 7,248,638 B1 | 7/2007 | Banister |
| 7,248,647 B2 | 7/2007 | Claussen et al. |
| 7,248,841 B2 | 7/2007 | Agee et al. |
| 7,251,460 B2 | 7/2007 | Khatri |
| 7,251,469 B2 | 7/2007 | Sudo |
| 7,257,170 B2 | 8/2007 | Love et al. |
| 7,257,424 B2 | 8/2007 | Hamalainen et al. |
| 7,260,153 B2 | 8/2007 | Nissani |
| 7,269,127 B2 | 9/2007 | Mody et al. |
| 7,269,224 B2 | 9/2007 | Stuber et al. |
| 7,280,604 B2 | 10/2007 | Giannakis et al. |
| 7,283,798 B1 | 10/2007 | Winters et al. |
| 7,286,961 B2 | 10/2007 | Kildal |
| 7,289,068 B2 | 10/2007 | Fujio et al. |
| 7,292,644 B2 | 11/2007 | Whang et al. |
| 7,296,045 B2 | 11/2007 | Sehitoglu |
| 7,302,009 B2 | 11/2007 | Walton et al. |
| 7,305,054 B2 | 12/2007 | Talwar |
| 7,308,287 B2 | 12/2007 | Vaidyanathan |
| 7,313,194 B2 | 12/2007 | Bar-Ness et al. |
| 7,315,570 B2 | 1/2008 | El-Gamal et al. |
| 7,317,750 B2 | 1/2008 | Shattil |
| 7,317,770 B2 | 1/2008 | Wang |
| 7,317,771 B2 | 1/2008 | Brunel |
| 7,319,714 B2 | 1/2008 | Sakata et al. |
| 7,321,564 B2 | 1/2008 | Ikram et al. |
| 7,324,193 B2 | 1/2008 | Lally et al. |
| 7,324,583 B2 | 1/2008 | Hooli et al. |
| 7,324,792 B2 | 1/2008 | Sim et al. |
| 7,324,794 B2 | 1/2008 | Chari et al. |
| 7,327,795 B2 | 2/2008 | Oprea |
| 7,327,798 B2 | 2/2008 | Won |
| 7,327,800 B2 | 2/2008 | Oprea et al. |
| 7,327,811 B2 | 2/2008 | Molnar |
| 7,327,812 B2 | 2/2008 | Auer |
| 7,327,983 B2 | 2/2008 | Mehta et al. |
| 7,328,033 B2 | 2/2008 | Rappaport et al. |
| 7,330,513 B2 | 2/2008 | Tsai et al. |
| 7,330,697 B1 | 2/2008 | Bolt et al. |
| 7,330,698 B1 | 2/2008 | Bolt et al. |
| 7,333,455 B1 | 2/2008 | Bolt et al. |
| 7,333,540 B2 | 2/2008 | Yee |
| 7,333,549 B2 | 2/2008 | Lee et al. |
| 7,333,551 B2 | 2/2008 | Hwang et al. |
| 7,333,560 B2 | 2/2008 | Jalali et al. |
| 7,336,719 B2 | 2/2008 | Gore et al. |
| 7,336,727 B2 | 2/2008 | Mukkavilli et al. |
| 7,339,980 B2 | 3/2008 | Grant et al. |
| 7,340,018 B2 | 3/2008 | Tynderfeldt |
| 7,340,671 B2 | 3/2008 | Jones et al. |
| 7,342,875 B2 | 3/2008 | Hammons, Jr. et al. |
| 7,342,970 B2 | 3/2008 | Liu |
| 7,346,040 B2 | 3/2008 | Weinstein |
| 7,346,104 B2 | 3/2008 | Yu et al. |
| 7,346,114 B2 | 3/2008 | Iancu et al. |
| 7,356,089 B2 | 4/2008 | Jia et al. |
| 7,359,311 B1 | 4/2008 | Paranjpe et al. |
| 7,359,313 B2 | 4/2008 | Chan et al. |
| 7,366,222 B2 | 4/2008 | Song et al. |
| 7,366,248 B2 | 4/2008 | Wang et al. |
| 7,366,520 B2 | 4/2008 | Haustein et al. |
| 7,372,830 B2 | 5/2008 | Jung et al. |
| 7,376,173 B2 | 5/2008 | Yedidia et al. |
| 7,382,840 B2 | 6/2008 | Molisch et al. |
| 7,391,815 B2 | 6/2008 | Lakkis |

OTHER PUBLICATIONS

Foschini, Luigi. Undecidability in quantum mechanics. No. quant-ph/9804040. 1998.
Jöngren, George, and Björn Ottersten. "Combining Transmit Antenna Weights with Orthogonal Space-Time Block Coding." Proceedings Nordiskt radioseminarium 1999. 1999.
Kaleka, Jaspreet Singh. Weighted multilevel space-time trellis codes for rayleigh fading channels. Diss. Thapar University, 1956.
Thielecke, Jörn, and Udo Wachsmann. "Capacity Assessment of MIMO Transmission Techniques." (2002).
Driessen, Peter F. "Future Mobile Telecommunications Systems." (1997).
Z Zhang, SW Cheung, Ti Yuk, "Exact evaluation of block-error rate using correct . . . " Trans. Inform. Theory, 1998—hub.hku.hk.
Ning Zhang, Ada Poon, David Tse and Robert Brodersen, "Tradeoffs of Performance and Single Chip Implementation of Indoor Wireless Multi-Access Receivers" 0-7803-5668-3/99 1999 IEEE.

(56) References Cited

OTHER PUBLICATIONS

Giuseppe Caire, et al., "Optimum Power Control Over Fading Channels", IEEE Transactions on Information Theory, vol. 45, No. 5, Jul. 1999, 1468-1489.

Sergey Loyka, "The Influence of Electromagnetic Environment on Operation of Active Array Antennas: Analysis and Simulation Techniques", IEEE Antennas and Propagation magazine, 41(6) (Dec. 1999) 23-39.

Wu, YC; Serpedin, E, "Non-data-aided ML symbol timing estimation in MIMO correlated fading channels", The 62nd IEEE VTS Vehicular Technology Conference Proceedings, Dallas, Texas, USA, Sep. 25-28, 2005, v. 4, p. 2091-2095.

Aradhana Narula, Mitchell D. Trott, and Gregory W. Wornell, "Performance Limits of Coded Diversity Methods for Transmitter Antenna Arrays", IEEE Transactions on Information Theory, vol. 45, No. 7, Nov. 1999, 2418-2433.

Francois Horlin Eduardo Lopez-Estraviz Liesbet Van der Perre, "Space-Time Block Coding for Uplink Single-Carrier CDMA with Joint Detection in the Frequency Domain", IEEE Trans. Wireless Comm., Jun. 2007, 2096-2105.

Frederik Petre, Geert Leus, Marc Moonen, "Multi-Carrier Block-Spread CDMA for Broadband Cellular Downlink", Eurasip Journal on Applied Signal Processing (Submitted) Feb. 28, 2003.

F. Petre, Geert Leus, Luc Deneire, M.G.E. Engels, M. Moonen, et al.. Space-time block coding for single-carrier block transmission DS-CDMA downlink. IEEE Journal on Selected Areas in Communications, Institute of Electrical and Electronics Engineers (IEEE), 2003, 21 (3), pp. 350-361. <10.1109/JSAC.2003.809630>. <hal-00187763>.

Nadine Chapalain, David Mottier, Damien Castelain, "An OFCDM Uplink Transmission System with Channel Estimation Based on Spread Pilots"—ISTMCS04 (2004).

Georgios B. Giannakis, Paul A. Anghel, Zhengdao Wang, "Wideband Generalized Multi-Carrier CDMA Over Frequency-Selective Wireless Channels", ICASSP00 (2000).

Georgios B. Giannakis, Anastasios Stamoulis, Zhengdao Wang, Paul A. Anghel, "Load-Adaptive MUI/ISI-Resilient Generalized Multi-Carrier CDMA with Linear and DF Receivers", May 17, 2000.

Sergey L. Loyka, Juan R. Mosig, "Nonlinear Modeling and Simulation of Active Array Antennas", 5th COST 260 MC & WG Meeting, Wroclaw, Poland, Jun. 30-Jul. 2, 1999.

Bjovn Ottersten, A. Lee Swindlehurst, "Antenna Arrays for Wireless Networks", IEEE Signal Processing Magazine Mar. 1999.

Li et al.: Spatial—Temporal Equalization for IS-136 TDMA Systems, IEEE Transactions on Vehicular Technology, vol. 48, No. 4, Jul. 1999.

Richard Todd Causey, "Blind Multiuser Detection Based on Second-Order Statistics", PhD Thesis, Georgia Institute of Technology, Jul. 30, 1999.

Gregory J. Pottie, Wireless Multiple Access Adaptive Communications Techniques, CRC Press—1999—500 pages.

Foschini, Gerard J. "Layered space-time architecture for wireless communication in a fading environment when using multi-element antennas." Bell labs technical journal 1.2 (1996): 41-59.

Sylla, Lamine, Paul Fortier, and Huu Tuê Huynh. "Performance of COFDM using turbo codes." Proc. of IEEE Canadian Conference on Electrical and Computer Engineering, Edmonton, Alta, Canada. 1999.

Vikalo, Haris, and Babak Hassibi. "Maximum-likelihood sequence detection of multiple antenna systems over dispersive channels via sphere decoding." EURASIP Journal on Advances in Signal Processing 2002.5 (1900): 525-531.

Fricke, Justus Ch, et al. "Impact of the Gaussian approximation on the performance of the probabilistic data association MIMO decoder." EURASIP Journal on Wireless Communications and Networking 2005.5 (1900): 796-800.

Caire, Giuseppe, Giorgio Taricco, and Ezio Biglieri. "Optimum power control over fading channels." Information Theory, IEEE Transactions on 45.5 (1999): 1468-1489.

Chen, Jiunn-Tsair, Constantinos Papadias, and Gerard J. Foschini. "Space-time dynamic signature assignment for the reverse link of DS-CDMA systems." Communications, IEEE Transactions on 52.1 (2004): 120-129.

Liu, Zhiqiang, Yan Xin, and Georgios B. Giannakis. "Space-time-frequency coded OFDM over frequency-selective fading channels." Signal Processing, IEEE Transactions on 50.10 (2002): 2465-2476.

Ma, Xiaoli, and Georgios B. Giannakis. "Space-time coding for doubly selective channels." Circuits and Systems, 2002. ISCAS 2002. IEEE International Symposium on. vol. 3. IEEE, 2002.

Liu, Zhiqiang, Xiaoli Ma, and Georgios B. Giannakis. "Space-time coding and Kalman filtering for time-selective fading channels." Communications, IEEE Transactions on 50.2 (2002): 183-186.

Petré, Frederik, et al. "Space-time block coding for single-carrier block transmission DS-CDMA downlink." Selected Areas in Communications, IEEE Journal on 21.3 (2003): 350-361.

Narula, Aradhana, Mitchell D. Trott, and Gregory W. Wornell. "Performance limits of coded diversity methods for transmitter antenna arrays." Information Theory, IEEE Transactions on 45.7 (1999): 2418-2433.

Horlin, Francois, Eduardo Lopez-Estraviz, and Liesbet Van der Perre. "Space-time block coding for uplink single-carrier CDMA with joint detection in the frequency domain." Wireless Communications, IEEE Transactions on 6.6 (2007): 2096-2105.

Zheng, Haitao, Angel Lozano, and Mohamed Haleem. "Multiple ARQ processes for MIMO systems." Personal, Indoor and Mobile Radio Communications, 2002. The 13th IEEE International Symposium on. vol. 3. IEEE, 2002.

Knessl, Charles. "A diffusion model for two parallel queues with processor sharing: transient behavior and asymptotics." International Journal of Stochastic Analysis 12.4 (1999): 311-338.

OFDM and MIMO-OFDM System. Penerbit Universiti Teknologi Malaysia, 2008.

Biglieri, Ezio, John Proakis, and Shlomo Shamai. "Fading channels: Information-theoretic and communications aspects." Information Theory, IEEE Transactions on 44.6 (1998): 2619-2692.

Peppas, Kostas, et al. "Performance evaluation at the system level of reconfigurable space-time coding techniques for HSDPA." EURASIP Journal on Advances in Signal Processing 2005.11 (1900): 1656-1667.

Tarokh, Vahid, Nambi Seshadri, and A. Robert Calderbank. "Space-time codes for high data rate wireless communication: Performance criterion and code construction." Information Theory, IEEE Transactions on 44.2 (1998): 744-765.

Wolniansky, Peter W., et al. "V-BLAST: An architecture for realizing very high data rates over the rich-scattering wireless channel." Signals, Systems, and Electronics, 1998. ISSSE 98. 1998 URSI International Symposium on. IEEE, 1998.

Tarokh, Vahid, Hamid Jafarkhani, and A. Robert Calderbank. "Space-time block coding for wireless communications: performance results." Selected Areas in Communications, IEEE Journal on 17.3 (1999): 451-460.

Golden, G. D., et al. "Detection algorithm and initial laboratory results using V-BLAST space-time communication architecture." Electronics letters 35.1 (1999): 14-16.

Foschini, Gerard J., et al. "Simplified processing for high spectral efficiency wireless communication employing multi-element arrays." Selected Areas in Communications, IEEE Journal on 17.11 (1999): 1841-1852.

Negi, Rohit, Ardavan Maleki Tehrani, and John Cioffi. "Adaptive antennas for space-time coding over block-time invariant multipath fading channels." Vehicular Technology Conference, 1999 IEEE 49th. vol. 1. IEEE, 1999.

Diggavi, Suhas N. "Analysis of multicarrier transmission in time-varying channels." Communications, 1997. ICC'97 Montreal, Towards the Knowledge Millennium. 1997 IEEE International Conference on. vol. 3. IEEE, 1997.

Tehrani, Ardavan Maleki, et al. "An implementation of discrete multi-tone over slowly time-varying multiple-input/multiple-output channels." Global Telecommunications Conference, 1998. GLOBECOM 1998. The Bridge to Global Integration. IEEE. vol. 5. IEEE, 1998.

(56) References Cited

OTHER PUBLICATIONS

A. R. Calderbank, "The Art of Signaling: Fifty Years of Coding Theory", IEEE Transactions on Information Theory, vol. 44, No. 6, Oct. 1998.
Tehrani, Ardavan Maleki, Rohit Negi, and John Cioffi. "Space-time coding over a code division multiple access system." Wireless Communications and Networking Conference, 1999. WCNC. 1999 IEEE. IEEE, 1999.
Jongren, George, and Björn Ottersten. "Combining transmit antenna weights and orthogonal space-time block codes by utilizing side information." Signals, Systems, and Computers, 1999. Conference Record of the Thirty-Third Asilomar Conference on. vol. 2. IEEE, 1999.
Knopp, Raymond, and Giuseppe Caire. "Power control schemes for TDD systems with multiple transmit and receive antennas." Global Telecommunications Conference, 1999. GLOBECOM'99. vol. 5. IEEE, 1999.
Wong, Kai-Kit, K. Ben Letaief, and Ross David Murch. "Investigating the performance of smart antenna systems at the mobile and base stations in the down and uplinks." Vehicular Technology Conference, 1998. VTC 98. 48th IEEE. vol. 2. IEEE, 1998.
Caire, Giuseppe, P. D. Torino, and E. Biglieri. "Capacity of multi-antenna block-fading channels." Communication Theory Mini-Conference, 1999. IEEE, 1999.
Khaled, Nadia, et al. "Spatial-mode selection for the joint transmit and receive MMSE design." EURASIP Journal on Advances in Signal Processing 2004.9 (1900): 1199-1211.
Dasgupta, Soura, Chris Schwarz, and Brian DO Anderson. "Optimum subband coding of cyclostationary signals." Acoustics, Speech, and Signal Processing, 1999. Proceedings., 1999 IEEE International Conference on. vol. 3. IEEE, 1999.
Blum, Rick S. "Maximum MIMO system mutual information with antenna selection and interference." EURASIP Journal on Advances in Signal Processing 2004.5 (1900): 676-684.
Hottinen, Ari, Risto Wichman, and Dinesh Rajan. "Soft weighted STTD for W-CDMA." Allerton Conference on Communication, Control and Computing. 1999.
Diggavi, Suhas N. Communication in the presence of uncertain interference and channel fading. Diss. stanford university, 1998.
Shiu, Da-Shan, et al. "Fading correlation and its effect on the capacity of multielement antenna systems." Communications, IEEE Transactions on 48.3 (2000): 502-513.
Hughes, Brian L. "Differential space-time modulation." Information Theory, IEEE Transactions on 46.7 (2000): 2567-2578.
Raleigh, G. C., and John M. Cioffi. "Spatio-temporal coding for wireless communication." Communications, IEEE Transactions on 46.3 (1998): 357-366.
Johansson, Sven, et al. "Evaluation of a Multiple—versus a Single—Reference MIMO ANC Algorithm on Dornier 328 Test Data Set." ISMA 23, 1998 International Conference on Noise and Vibration Engineering. Katholieke Universiteit Leuven, Division of Production Engineering, Machine Design & Automation, 1998.
Tarokh, Vahid, Hamid Jafarkhani, and A. Robert Calderbank. "Space-time block codes from orthogonal designs." Information Theory, IEEE Transactions on 45.5 (1999): 1456-1467.
Marzetta, Thomas L. "BLAST training: Estimating channel characteristics for high capacity space-time wireless." Proceedings of the Annual Allerton Conference on Communication Control and Computing. vol. 37. The University; 1998, 1999.
Chit Lo, Todd K. Mason, Optimal Detection and Signaling in fast Fading Channels, Utah State University, Mar. 16, 2002.

Driessen, Peter F., and Gerard J. Foschini. "On the capacity formula for multiple input-multiple output wireless channels: A geometric interpretation." IEEE Transactions on Communications 47.2 (1999): 173-176.
Shiu, Da-Shan, and Joseph M. Kahn. "Layered space-time codes for wireless communications using multiple transmit antennas." Communications, 1999. ICC'99. 1999 IEEE International Conference on. vol. 1. IEEE, 1999.
Naguib, Ayman F., et al. "A space-time coding modem for high-data-rate wireless communications." Selected Areas in Communications, IEEE Journal on 16.8 (1998): 1459-1478.
Shiu, Da-shan, and Joseph M. Kahn. "Scalable layered space-time codes for wireless communications: performance analysis and design criteria." Wireless Communications and Networking Conference, 1999. WCNC. 1999 IEEE. IEEE, 1999.
Liu, Youjian, and Michael P. Fitz. "Space-time turbo codes." Proceedings of the Annual Allerton Conference on Communication Control and Computing. vol. 37. The University; 1999.
Negi, Rohit, Ardavan Maleki Tehrani, and John Cioffi. "Adaptive antennas for space-time coding over block-time invariant multipath fading channels." Vehicular Technology Conference, 1999 IEEE 49th. vol. 1, IEEE, 1999.
Tehrani, Ardavan Maleki, Rohit Negi, and John Cioffi. "Space-time coding and transmission optimization for wireless channels." Signals, Systems Computers, 1998. Conference Record of the Thirty-Second Asilomar Conference on. vol. 2. IEEE, 1998.
Hochwald, Bertrand M., and Thomas L. Marzetta. "Space-time modulation for unknown fading." AeroSense'99. International Society for and and Photonics, 1999.
Safar, Zoltan, and K. J. Liu. "Systematic design of space-time trellis codes for diversity and coding advantages." EURASIP Journal on Advances in Signal Processing 2002.3 (1900): 221-235.
Grant, Alex. "Rayleigh fading multi-antenna channels." EURASIP Journal on Advances in Signal Processing 2002.3 (1900): 316-329.
Chen, Jiunn-Tsair, Constantinos B. Papadias, and Gerard J. Foschini. "Dynamic signature assignment for reverse-link CDMA systems." Communications, 1999. ICC'99. 1999 IEEE International Conference on. vol. 2. IEEE, 1999.
Sampath, H., and A. Paulraj. "Space-time processing TDMA wireless testbed." Acoustics, Speech, and Signal Processing, 1999. Proceedings., 1999 IEEE International Conference on. vol. 4. IEEE, 1999.
Marzetta, Thomas L., and Bertrand M. Hochwald. "Capacity of a mobile multiple-antenna communication link in Rayleigh flat fading." Information Theory, IEEE Transactions on 45.1 (1999): 139-157.
Tehrani, Ardavan Maleki, et al. "An implementation of discrete multi-tone over slowly time-varying multiple-input/ multiple-output channels." Global Telecommunications Conference, 1998. GLOBECOM 1998. The Bridge to Global Integration. IEEE. vol. 5. IEEE, 1998.
Ponnekanti, Seshaiah. "An overview of smart antenna technology for heterogeneous networks." IEEE Communication Surveys 2.4 (1999): 14-23.
Foschini, Luigi. "On the logic of quantum physics and the concept of the time." arXiv preprint quant-ph/9804040 (1998).
Narula, Aradhana, et al. "Efficient use of side information in multiple-antenna data transmission over fading channels." Selected Areas in Communications, IEEE Journal on 16.8 (1998): 1423-1436.
Abou-Faycal, Ibrahim, and Bertrand M. Hochwald. "Coding requirements for multiple-antenna channels with unknown Rayleigh fading." Bell Labs., Lucent Technol., Murray Hill, NJ, Tech. Rep 10 (1999).
Winters, Jack H. "Smart antennas for wireless systems." Personal Communications, IEEE 5.1 (1998): 23-27.

\* cited by examiner

ELECTRONIC PICKET FENCES

DETECTING A STEALTH CRAFT WITH
A SINGLE TRANSMITTER/RECEIVER

DETECTING DISTANCE TO STEALTH CRAFT
BY TRIANGULATION

CANCELLATION

Background Cancellation and Leading and Trailing Edge Detection

| | Current ground reflection i.e., Signal from current time | Previous ground reflection- Signal from current Time minus delay | Resulting Signal |
|---|---|---|---|
| Ground | S | S | NS |
| Leading edge air boundary | S | S | NS |
| Leading edge of craft | NS | S | S |
| Middle of craft | NS | NS | NS |
| Trailing edge of craft | NS | NS | NS |
| Trailing edge air boundary | S | NS | S |

S = Signal
NS = No Signal

Fig. 5

Background Cancellation and Making a Silhouette White

| | Current ground reflection i.e., Signal from current time | Previous ground reflection Signal from time before stealth detected | Resulting Signal |
|---|---|---|---|
| Ground | S | S | NS |
| Leading edge air boundary | S | S | NS |
| Leading edge of craft | NS | S | S |
| Middle of craft | NS | S | S |
| Trailing edge of craft | NS | S | S |
| Trailing edge air boundary | S | S | NS |

S = Signal
NS = No Signal

Fig. 6

Background Cancellation and Making a Shadow White Shadow

| Area | Pre-Stealth Craft Signal (delayed reflection) | Current Signal (Current reflection) | Result |
|---|---|---|---|
| Current Shadow | Signal | No Signal | Signal |
| Non-Shadow | Signal | Signal | No Signal |

Fig. 7

DETECTING A STEALTH CRAFT WITH
OMNI DIRECTIONAL TRANSMITTER AND SEPARATE RECEIVER

DETECTION AND DISTANCE DETERMINATION WITH
TWO TRANSMITTERS AND ONE RECEIVER USING SHADOWS

DETECTION AND DISTANCE DETERMINATION WITH
ONE TRANSMITTER AND ONE RECEIVER
USING BOTH SILHOUETTE AND SHADOW

DETECTION OF STEALTH CRAFT USING THE SKY AS "REFLECTOR"

DETECTION OF STEALTH CRAFT USING
COSMIC BACKGROUND RADIATION

PASSIVE (BACKGROUND) DISTANCE DETERMINATION
DISTANCE DETERMINATION WITH COSMIC
BACKGROUND RADIATION

METHOD AND APPARATUS FOR THE DETECTION OF OBJECTS USING ELECTROMAGNETIC WAVE ATTENUATION PATTERNS

CROSS REFERENCE TO RELATED APPLICATIONS

The present application is a Continuation of U.S. patent application Ser. No. 13/471,648, filed May 15, 2012, now U.S. Pat. No. 8,890,744, issued Nov. 18, 2014, which is a Continuation of U.S. patent application Ser. No. 13/093,447, filed Apr. 25, 2011, now U.S. Pat. No. 8,179,299, issued May 15, 2012, which is a continuation of U.S. Ser. No. 09/545,407, filed Apr. 7, 2000, now U.S. Pat. No. 7,952,511, issued May 31, 2011, which is a non-provisional of U.S. Provisional Patent Application No. 60/128,233, filed Apr. 7, 1999, the entirety of which are expressly incorporated herein by reference.

BACKGROUND OF THE INVENTION

Radar was developed in World War II to detect enemy aircraft. It has subsequently been refined to detect a large variety of objects, including ships, helicopters, satellites, and land vehicles. Radar systems typically work on the principle of bouncing microwave radiation off an object and analyzing the reflected signal (echo). The reflected signal can be used to develop information about the object, e.g., by measuring the round trip signal (echo) time the distance to the object can be determined, and by determining a Doppler shift of the echo a velocity of the object may be estimated. With sophisticated system design, object shape and size may be analyzed. Finally, a temporal analysis of sequential echoes may be used to detect a motion vector and characteristics of moving parts of the object.

Radar systems thus emit an electromagnetic wave or pulse, and analyze a reflection pattern to determine a characteristic of the object, distinguishing the object from clutter and background based on a return time of the echo. Radar is typically employed to determine an object profile, or shape, distance (range) and/or its velocity.

Electromagnetic detection techniques have developed to include radio frequency and microwave Radar, laser Radar (Lidar), FLIR (forward looking infrared), fluorescence techniques (especially to detect jet engine combustion emissions) and visual techniques.

Once Radar saw widespread use, military planners saw the military advantage that would accrue from having craft that are invisible to Radar. After decades of research and development, the United States began deployment of so called stealth aircraft in the 1980's. The next generation of helicopters, ships and missiles are also designed to be "stealthy". Any craft can be designed to be stealthy, including land craft and satellites. The design principles of stealth aircraft are principally to (a) reduce radar reflections, especially retroreflections, of all kinds, and (b) to particularly hide or reduce characteristic signatures of aircraft, such as signals produced by engine turbine blades and wing surfaces.

The primary method for making an object stealthy is to reduce its radar cross section. While much of the performance of stealth aircraft is classified, it has been claimed a stealth fighter has the radar cross section of a normal plane the size of a bird, i.e., that it reflects no more microwave energy back to the detection device than a non-stealth plane the size of a bird.

There are several techniques, applied together, that are used to effect stealth. One is to design the craft so that flat surfaces are divided into small areas of various inclinations, disposed to avoid reflecting the signal directly back to the receiver. The craft is designed such that exposed surfaces present oblique angles or rounded surfaces that scatter or diffuse the signal away from the source of the radar beam. In addition, surfaces are coated with materials that absorb microwave radiation, and honeycomb sections are formed which trap microwaves, preventing reflections. See, U.S. Pat. Nos. 5,808,577, 5,697,394, 5,694,763, 5,536,910, 5,420,588, 5,276,477, 5,036,323, 4,606,848, 4,173,018, 4,117,485, 4,030,098, 4,019,699, expressly incorporated herein by reference.

The United States no longer has a monopoly on stealth craft. After the efficacy of stealth was proved during the Persian Gulf War, Germany, Russia, South Africa and other developed countries accelerated their development of stealth craft, and now not only have stealth craft for their own use, but are poised to sell stealth craft to developing countries, some of which are hostile to the United States.

Therefore, it is becoming increasing important for any military to be able to detect stealth craft.

The existing methods for detection of stealth aircraft include thermal signatures, exhaust signatures, acoustic signatures (see, U.S. Pat. No. 4,811,308, expressly incorporated herein by reference), radar employing non-traditional wavelengths (see, U.S. Pat. Nos. 5,850,285, and 5,657,022, expressly incorporated herein by reference), satellite imagery, and analysis of radio frequency emissions from the aircraft. However, none of these methods replaces traditional Radar monitoring.

U.S. Pat. No. 5,990,822 (Honigsbaum, Nov. 23, 1999), expressly incorporated herein by reference, describes a system for detecting stealthcraft based on silhouette methods, e.g., where the receiver aperture is aligned with an outgoing transmitted beam. Distance to an object is estimated by triangulation and sequence of beam returns.

SUMMARY OF THE INVENTION

The present invention therefore provides a method and apparatus for the detection of objects, e.g., all craft types, regardless of whether they are designed to have a low radar profile or not, and thus including both stealth craft as well as non-stealth craft. In particular, it is sought to detect airplanes, Intercontinental Ballistic Missiles (ICBM), helicopters, satellites, cruise missiles, pilotless drones, balloons, High Altitude Long Endurance (HALE) platforms (which are robotically piloted dirigibles or winged craft), ships, boats, submarines, tanks, trucks, armored personnel carriers, and cars.

The present invention operates by detecting, not the echo of an electromagnetic wave reflecting off an object, but rather an attenuation of an electromagnetic wave pattern due to obstruction of beam propagation by the object. Therefore, design principles of stealth craft which seek to absorb microwave radiation will increase contrast, making them "visible".

While beam interruption sensors are well known and used in security systems and industrially, the present system includes a number of distinctions. The system according to the present invention does not seek to provide a narrow beam that is fully blocked by the object to be detected. Rather, at the typical region of intersection between the beam and the craft, the beam illuminates a much larger area than the cross section of the craft. The present invention, in fact, seeks a wide area of coverage, and therefore provides a region of detection significantly larger than a "line of sight". It is noted that, in traditional systems, detection is limited to "line of sight", possibly with predetermined reflections of the beam, and off axis sensitivity is extremely limited by design. Thus, according to the present invention, a large volume of space may be monitored by a detector node, similar to traditional Radar installations and in contrast to known shadow detectors.

Video detectors are also known. These detectors monitor pixels of an imaging sensor for illumination changes, which may be due to shadowing of a background. These systems, however, are limited to certain electromagnetic bands, for example mid- or near infrared to X-ray ranges. As such, these systems are only employed in limited range applications, since beam propagation may be limited by atmospheric conditions or noise, and typically are difficult to accurately detect over long distances through the atmosphere. In contrast, the present invention employs a long range detection system, for example having a detection range of at least several miles, and detection over a large volume, for example at least several cubic miles.

The principal of the Negative Radar can best be explained in terms of an analogy. Suppose an airplane was coated with a surface that absorbed all visible light, thus reflecting no light. If, during the night, you aimed a search light at the airplane, you would not see any reflected light, making the plane not visible, thus effectively invisible. However, if you observed the same airplane flying the next day against a blue sky, you could see the silhouette of the airplane.

Similarly, the present invention provides a method and apparatus for detecting an alteration in a background radiation pattern resulting from an object interfering with transmission thereof.

In order to be effective, the electromagnetic wave path between the region to be monitored and the receiver must have a set of convergent wave paths. Typically, this is effected by providing an intermediate scattering of the electromagnetic beam. While this intermediate scattering reduces beam power efficiency as compared to a substantial retroreflection, in typical applications thus reduction in sensitivity is compensated by an increase in output power, or the use of an existing high power irradiation source.

It is noted that one method for defeating the detection method and apparatus according to present invention is to emit a radiation pattern from the object corresponding to a presumed or measured background pattern, in order to avoid detection. In order for such a system to also defeat detection by normal Radar and radio frequency emission monitoring methods, a phased array antenna must accurately detect the incident illumination pattern and a phased array antenna on an opposing craft surface must retransmit the corresponding pattern, wherein the phased array antennas must encompass an area on each face of the craft (e.g., top, bottom, sides, front and rear) and must be themselves "stealth" designs. Such an anti-detection system is therefore another aspect of the present invention. See, U.S. Pat. No. 4,684,952, expressly incorporated herein by reference.

In one embodiment of the invention, specific artificial sources of radar emissions are deployed and/or employed to specifically define a pattern to be interrupted by the craft to be detected. It is noted that typical stealth designs make presumptions regarding the angle between the emitted Radar wave for detection and the receiver, i.e., that these are close or identical. Therefore, a particular design principle of stealth craft is to avoid any direct reflections or retroreflections of microwave energy. These presumptions fail where the angle is substantially different from zero, for example the limit case of obscurance of a microwave source. However, these methods also fail under other circumstances.

As used herein, the phrase Negative Radar refers to the effect wherein the silhouette of any craft, including a stealth craft, will block transmission of a Radar beam, resulting in detectability of the attenuation of the microwave radiation. The Negative Radar approach can be used with active or passive detection techniques.

In an active detection technique, electromagnetic energy, such as radio frequency, microwave, visible light, or infrared light (from a laser) is directed toward a target, and the interaction of the emitted energy with the target is used to detect the presence of the target, and to derive characteristics of the target, such as distance, bearing, speed, size, and profile. According to the present invention, the beam transmission characteristics are used for detection, rather than reflection characteristics.

In an active detection scheme according to the present invention for Negative Radar, an electromagnetic wave is bounced off a large reflector, such as the Earth, and the silhouette (or attenuation of the electromagnetic wave) produced by the craft, by blocking part of the wave or part of the reflection of the wave, is detected.

In a passive detection embodiment of the invention, no energy is intentionally directed toward the target. Instead, natural or preexisting (and relatively uncontrolled) sources of electromagnetic radiation are employed to look for the silhouette (or attenuation of the beam) of the craft. Typically, the passive detection techniques will employ background radiation from the sky (e.g., 3 degree K black body radiation), or the infrared energy emitted by the Earth (e.g., 300 degree K black body radiation). Another useful source of "passive" energy is man-made satellites, for example GPS satellites and the Iridium satellite constellation, which each have almost complete coverage of the globe and well defined radiation characteristics.

It is therefore an object of the invention to provide a method for the remote detection of an object within a large space, comprising detecting a normal pattern of illumination of the space with electromagnetic radiation, allowing the object to enter the space, and detecting an attenuation from the normal pattern resulting therefrom. In this case, the space is substantially larger than the object, and the aperture of the receiver is wide.

It is also an object of the invention to provide a method of operating a negative radar device for detecting objects, e.g., stealth craft or non-stealth craft, herein called "Stealth Craft", comprising the steps of either detecting the absence of microwave radiation, or both transmitting microwave radiation and detecting the absence of microwave radiation, due to the stealth craft attenuating (blocking) the microwave radiation when it positioned between the source of microwave radiation (or a reflection from the source) and the microwave detector or receiver (or surface that reflects microwave to the detector or receiver).

It is a further object of the invention to provide a method and apparatus for detecting an object, comprising the steps of defining expected characteristics of a scattered invisible electromagnetic radiation pattern to be detected at a receiver, attenuating at least a portion of an invisible electromagnetic radiation field by a presence of an object within a path of invisible electromagnetic radiation, said invisible electromagnetic radiation propagating off axis with respect to the receiver toward a scattering medium, and detecting the attenuation to indicate a presence of the object. The electromagnetic radiation may be man made or natural, and therefore sources such as earth (terrestrial) background radiation in the infrared band and cosmic background radiation in the microwave bands may advantageously be employed. The present invention may also use incidental effects from man-made radiation transmitted for unrelated purposes, or cooperating transmitters and receivers. The transmitter and/or receiver may be highly directional (collimated), in order to provide precision in localization or higher signal to noise ratio. Antenna apertures may be mechanically scanned, or comprise synthetic aperture systems with logically defined apertures. Adaptive background analysis techniques may be performed to differentiate dynamic effects from static effects.

According to a preferred embodiment of the invention, a receiver is provided displaced (e.g., substantially spaced) from the source of the electromagnetic radiation, wherein the perturbation in the electromagnetic radiation is detected as a displaced shadow on a distant scattering medium, such as the earth, or overhead, such as clouds or atmospheric particulates. The present invention also provides a system and method wherein a transmitter generates the electromagnetic radiation, a receiver detects the electromagnetic radiation, the transmitter and receiver having known positions with respect to the Earth, with a distance to the object being determined based on the known location of the receiver and the transmitter and by the vector from the receiver to a shadow of the electromagnetic radiation formed by the object on the Earth. Likewise, at least two electromagnetic radiation waves may be generated by at least two transmitters and a receiver, each with a known position, wherein a distance to the object is determined based on the known location of the receiver and both transmitters and by the vector from the receiver to the shadow from the first transmitter in geometric relationship with the vector from the receiver to the shadow from the second transmitter.

The object may be identified based on a computed distance to the object, the detected attenuation of the electromagnetic radiation, and a predetermined characteristic of the object. A system is also provided wherein a wavelength of a radio wave transmission is varied about a range including the effective size of the object, wherein as the wave exceeds the effective size, the objects apparently disappears. By monitoring perturbation (e.g., attenuation) of the silhouette (i.e., transmitted wave propagation axis and receiver aperture aligned) or shadow (i.e., transmitted wave propagation axis and receiver aperture not aligned), the effective size of the object may be determined. Typical objects of interest have sized and effective sizes in the range of between about 1 to 100 meters, and therefore a transceiver system adapted to operate in the 1 to 100 meter band may be used for such detection.

The invention also provides a negative radar device for detecting an object, e.g., stealth craft or non-stealth craft, comprising either a microwave receiver and optionally a microwave transmitter, said detector detecting the absence or attenuation of microwave radiation due to attenuation of the microwave radiation when the object is within the aperture of the receiver, e.g., generally positioned between the transmitter or other source of microwave radiation (or a reflection from the transmitter or other source) and the microwave receiver (or surface that reflects microwave to the detector).

Microwave, as generally used herein, may also encompass any electromagnetic radiation capable of attenuation by the object, unless specifically limited by the context. The object may be, e.g., any type of craft, e.g., airplanes, Intercontinental Ballistic Missiles (ICBM), helicopters, satellites, cruise missiles, pilotless drones, balloons, High Altitude Long Endurance (HALE) platforms, marine ships, boats, submarines, tanks, trucks, armored personnel carriers, and cars.

The microwave radiation may be, for example, the omnipresent cosmic background radiation, the blackbody radiation from the Earth, microwave radiation reflected from the ground or sky. The system may provide a single microwave transceiver for emitting and receiving the microwaves, or the transmitter and receiver may be spatially separated.

In order to collimate the microwaves for detection of small areas within the detection space, tubes may be used to limit the field of view that is seen by each detector, thus increasing the percentage attenuation caused by a Stealth Craft in that pixel of the Sky.

The aperture of a transmitter or/or receiver may be limited, to provide one or more narrow bands of electromagnetic radiation or apertures for receipt of radiation, in the form of a "picket fence". These bands may be static or swept. For example, the receiver may be omni-directional, while the transmitter sweeps the sky with bands of directional radiation. Alternately, the transmitter may be omni-directional, while the receiver may sweep the "sky" with bands of directional "beam" sensitivity, through the use of a moving mechanical antenna or a phased array radar system.

The distance to an object, e.g., a stealth craft, may be determined from the known location of both receiver and transmitter and by the vector from the receiver to the shadow of the stealth craft on the Earth in geometric relationship to the vector from the receiver to the silhouette of the stealth craft against the Earth.

According to another embodiment, there are at least two transmitters and at least one receiver, or there are at least two receivers. For example, two transmitters are provided, and the distance to the stealth craft is determined from the known location of the receiver and both transmitters, and by the vector from the receiver to the shadow from the first transmitter in geometric relationship with the vector from the receiver to the shadow from the second transmitter.

The transmitter need not be controlled or coupled to the detection system. For example, the transmitter may be a non-cooperating source of microwave radiation, such as a Direct Broadcast TV satellite, geopositioning (e.g., GPS or GLONASS) satellite, or a personal communication satellite. Therefore, the system need only provide a receiver and phased array antenna to detect and/or determine the distance to Stealth Craft.

In analyzing the received signal, an adaptive receiver design may be employed to cancel the normal illumination pattern. In this case, the background normally reflects or scatters the radiation. However, an obscuring object reduces the return signal. When compared with the adapted baseline signal, however, the silhouette and shadow of the stealth craft is seen as a positive indication of change in pattern.

The distance to the object, e.g., stealth craft, may be determined by comparing the apparent size of the stealth craft to a presumed actual size of the stealth craft, using geometrical techniques well known in the art.

These and other objects will be apparent from an understanding of the preferred embodiments.

BRIEF DESCRIPTION OF THE DRAWINGS

These and further objects and advantages of the invention will be more apparent upon reference to the following specification, claims and appended drawings wherein:

FIG. 5 shows a Table representing background cancellation and leading and trailing edge detection;

FIG. 6 shows a Table representing background cancellation and making a silhouette "white";

FIG. 7 shows a Table representing background cancellation and making a shadow "white";

DETAILED DESCRIPTION OF THE PREFERRED EMBODIMENTS

Figure 1:
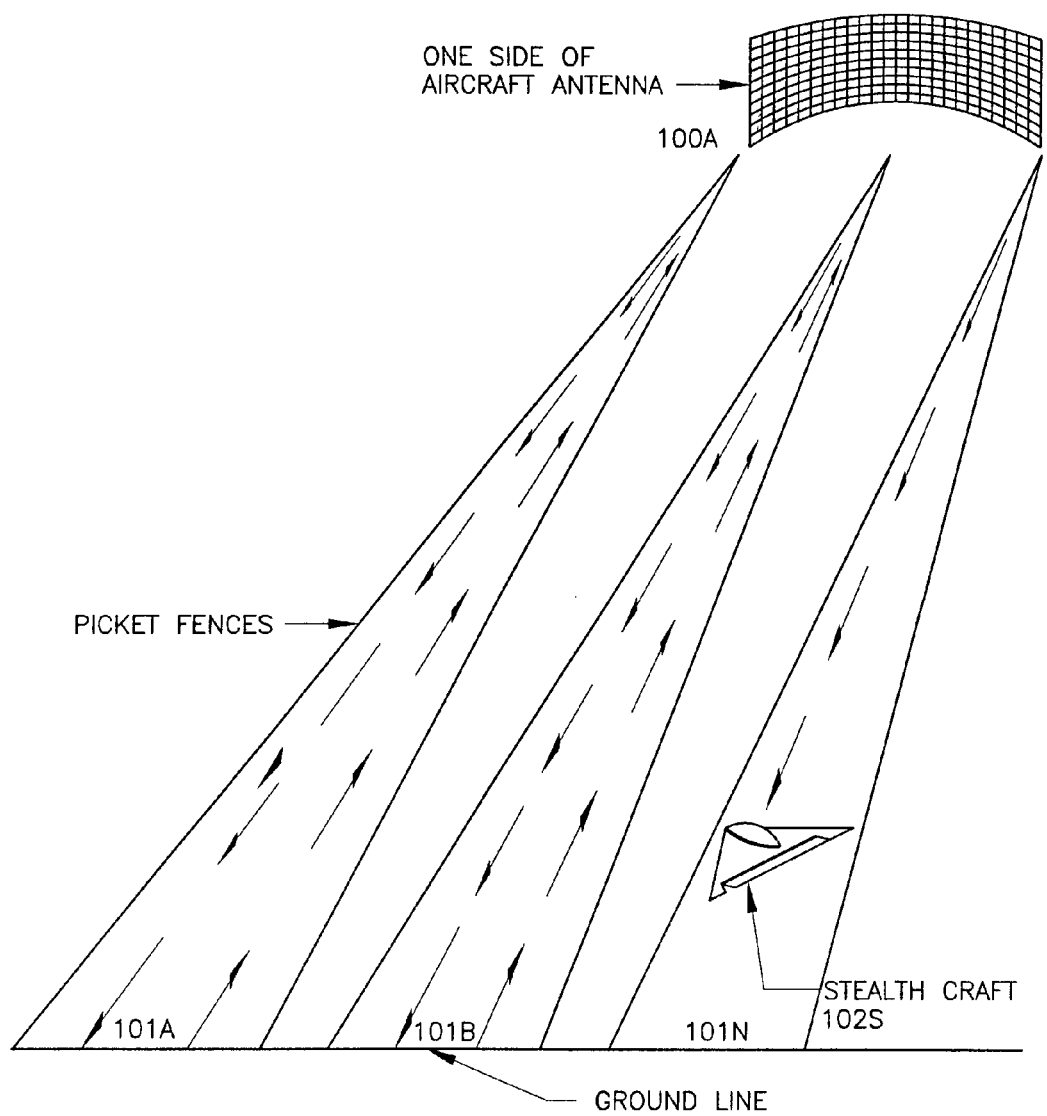
FIG. 1 shows a perspective view of a set of Electronic "Picket Fences"

The preferred embodiments will now be described by way of example, in which like reference numerals indicate like elements.

Active Detection

In standard active detection, a beam of electromagnetic energy, such as microwave, visible light, or infrared light (from a laser) is directed toward a target and the energy reflected from the target is used to detect the presence of the target, and to derive characteristics of the target, such as distance, bearing, speed, and size.

However, according to the present invention, negative radar, a microwave beam is bounced off a large reflector, such as the Earth, and the silhouette (or attenuation of the microwave) that the object produces against the beam or a reflection of the beam is detected. This method can also be used with non-stealth craft, since the Doppler shift of microwaves reflected from a non-stealth craft can be used to differentiate it from the microwave reflected from, e.g., the Earth, so that the microwaves reflected directly from the non-stealth craft can be ignored or separately analyzed.

The Doppler shift can also be used to detect and defeat a possible electronic countermeasure against negative radar. If a stealth craft emanated microwave radiation in an attempt appear transparent to the rays, e.g., not to produce a "silhouette" for the negative radar, the Doppler shift could be used to differentiate the microwave emanated from the stealth craft from the microwave reflected from, e.g., the Earth. Therefore, a successful countermeasure would not only have to emit radiation in the appropriate pattern, it would also have to be Doppler compensated. This would require, for example, a complex phased array transceiver system which measures electromagnetic radiation on any one surface and reemits it on an opposite surface, potentially requiring simultaneous transmission and reception in the same range or frequencies from all surfaces.

The following is an example of Negative Radar and active (as opposed to passive) detection. An aircraft, HALE craft, or satellite is provided at an altitude above that of the craft to be detected. A down-looking beam of electromagnetic energy is swept across the ground. The beam, in this case, could be infrared light (via a laser), microwave (with the beam steered either mechanically or electronically with a phased array antenna), or some other electromagnetic radiation, although microwave radiation is preferred. It is presumed that the ground below scatters the radiation, and therefore, the illuminated area will be substantially visible to the receiver.

For example, an aircraft is provided having a phased array Radar antenna, to allow for a full sweep of the entire zone of interest. As shown in FIG. 1, the aircraft 100a scans the area with a set of narrow spaced beams, creating a series of electronic "picket fences", 101a, 101b, . . . 101n. Each "picket fence" is thus a sweep of a plurality of individual beams. A particular advantage of this arrangement is that the entire zone is effectively covered over time with only a relatively small area of microwave illumination, and each "picket" may be individually analyzed, for example with different wavelengths and/or parameters.

When a Stealth Craft 1025 crosses an individual beam, the strength of the beam reflected from the ground is attenuated, because the Stealth Craft blocks a portion of the beam coming from the craft to ground, as well as part of the reflection of the beam from ground back to the aircraft. Therefore, in this case, it is possible to visualize the Stealth Craft as a "dark" area against the "white" background of Microwave reflected from the ground. This analysis, of course, preferably automated, and may involve high levels of analysis, for example to reduce noise, check consistency with other sensor systems, and adaptively process the signal. Typically, a background or normal radiation pattern from the ground is determined, and the received radiation compared with the background to determine the characteristics of the reflected components.

Figure 2:
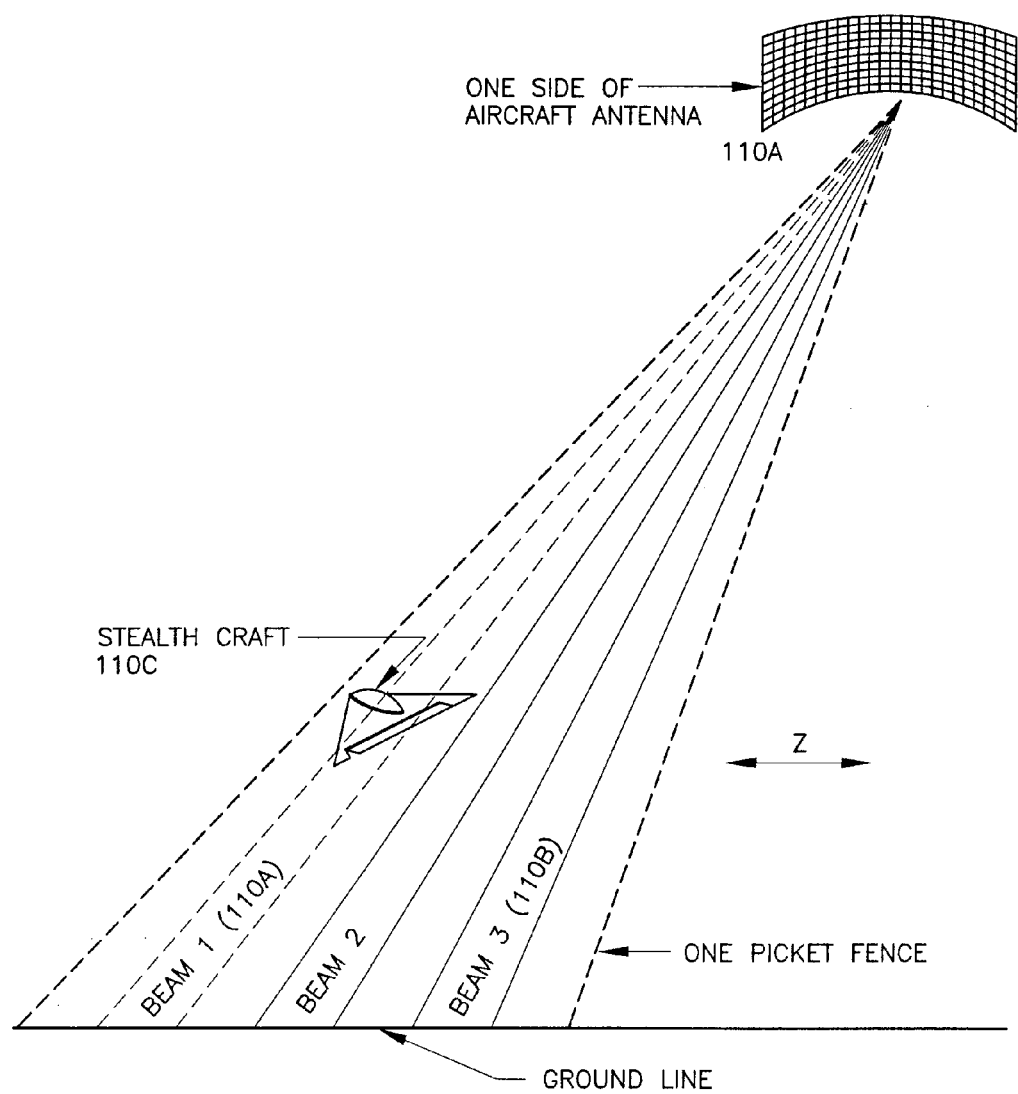
FIG. 2 shows a perspective view of a system for detecting Stealth Craft with a single transmitter/receiver.

As shown in FIG. 2, when a Stealth Craft is detected, we know that the Stealth Craft 110c is in the line-of-site between the source (aircraft Radar) 110a of beam 110b and the ground. Since we know where the beam is sweeping at any point in time, we know the Z position of the Stealth Craft, but not the Y position (altitude) and thus not the distance to the Stealth Craft.

Figure 3:
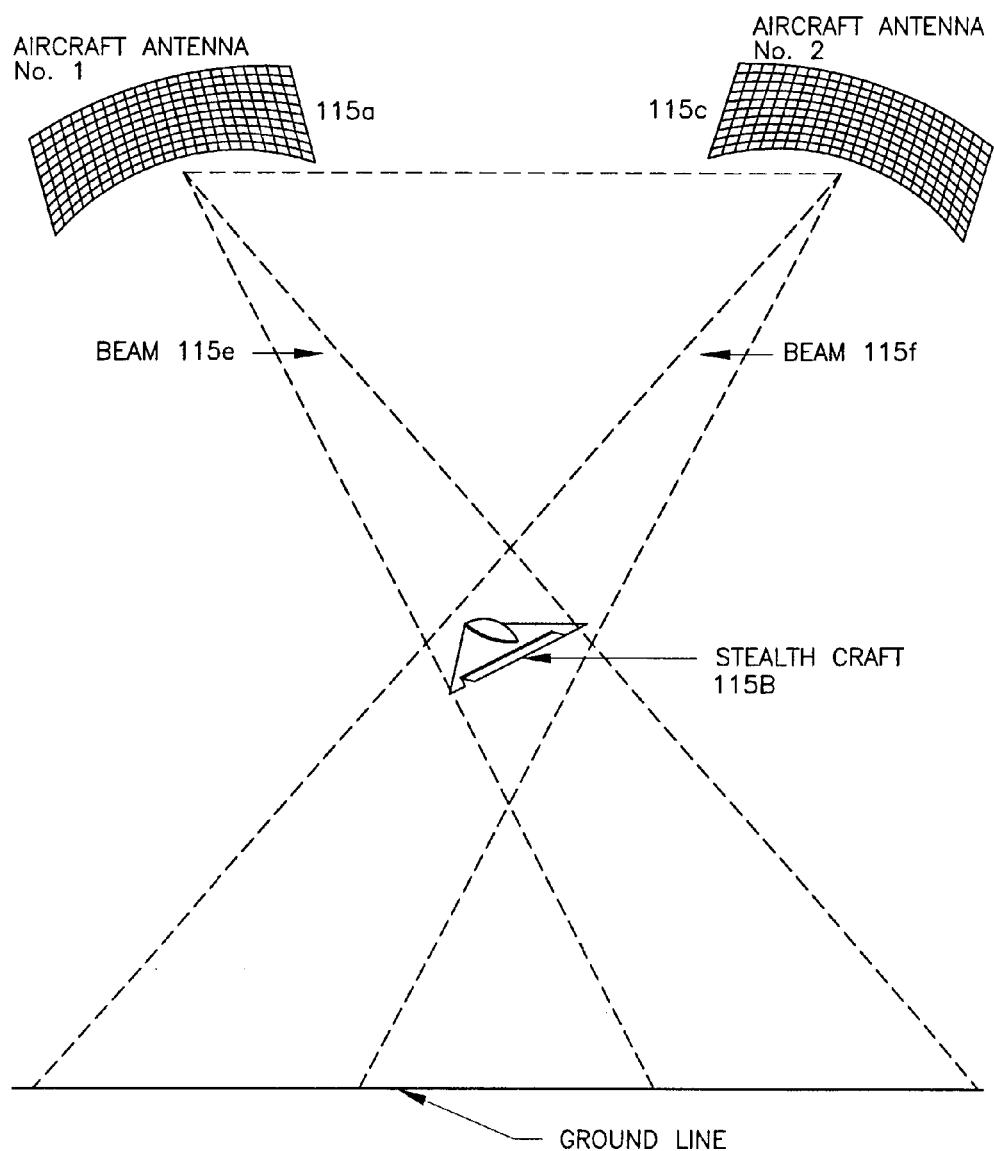
FIG. 3 shows a perspective view of a system for detecting a distance to a Stealth Craft by triangulation.

One way to find the distance to the Stealth Craft is a method of triangulation, as shown in FIG. 3. We assume a plurality of detecting craft creating picket fences via sweeping beams 115e and 115f. If a second detecting craft detects the Stealth Craft at time T, we know not only the 115a-115b path from the first detecting craft to the target craft, but the path 115c-115b from the second detecting craft to the Stealth Craft.

Since we know the absolute position of the two detecting craft, e.g., by the use of GPS, and we know the angle of the Stealth Craft relative to the two detecting craft, and we know the Z position of the Stealth Craft, we can form a triangle, and calculate, using basic geometry, the X, Y, Z position of the Stealth Craft, and thus the distance from each Radar to the Stealth Craft. The accuracy of the distance determination depends upon, for example, the width of the individual beams.

If only one Radar is used, the traditional way to determine the distance to a non-stealth Craft is to measure the time that it takes to receive the Microwave echo from the craft. Since the speed of Microwave in the air is known, about 300,000 KM/second, the distance to the craft may be determined. With a Stealth Craft, the echo from the craft is presumed unusable, so the distance to the Stealth Craft must be determined by other means.

One way to determine the distance is to compare the apparent size of the Stealth Craft to the actual size of the Stealth Craft, using geometrical techniques well known in the art and presumptions of the nature of the Stealth Craft. The apparent size is the size of the silhouette. The actual size can thus be determined by reading a computer reference file for the aircraft dimensions of the particular Stealth Craft suspected of detection. Ambiguities may be resolved by other data, such as maximum velocity, and radar signature characteristics. It is noted that traditional Radar is ineffective in detecting the presence of a Stealth Craft because of the large number of possible interfering signal sources and noise. On the other hand, where a specific position of a craft is suspected, numerous techniques may be employed to verify the existence of the craft.

Another way to find the actual size of the Stealth Craft is by increasing the wavelength of the Microwave until the silhouette disappears, i.e., until the size of the craft (cross-section) becomes a fraction of the wavelength, so that the Stealth Craft does not effectively attenuate the Microwave signal and thus becomes "invisible" to the Microwave.

The azimuth resolution, i.e., the minimum size of a feature you can detect, is dependent on the size of the antenna, the distance from the Radar to the object, and the wavelength, and is given by:

Resolution=(Wavelength×Range)/antenna length

Wavelength=(Resolution×Antenna length)/range

Thus, for a given antenna size, range and desired resolution, the wavelength needed to effect the needed resolution is defined, e.g., Wavelength=(1 m×20 m)/10,000 m
Wavelength=0.002 m
=2 mm The aforementioned distance measurement techniques would also work for non-stealth craft, since the Doppler shift of microwaves reflected from the non-stealth craft could be used to differentiate it from microwave reflected from the ground, so that the microwaves reflected from the craft could be ignored. Thus, by providing a filter to detect microwaves shifted by an amount representing a minimum presumed velocity of an aircraft, background clutter may be effectively eliminated.

Active downlooking Radar will show clutter, i.e., reflection from the ground. The varying characteristics of the surface of the ground and items on the surface will result in a varying amount of reflected microwave signal from the ground.

Figure 4:
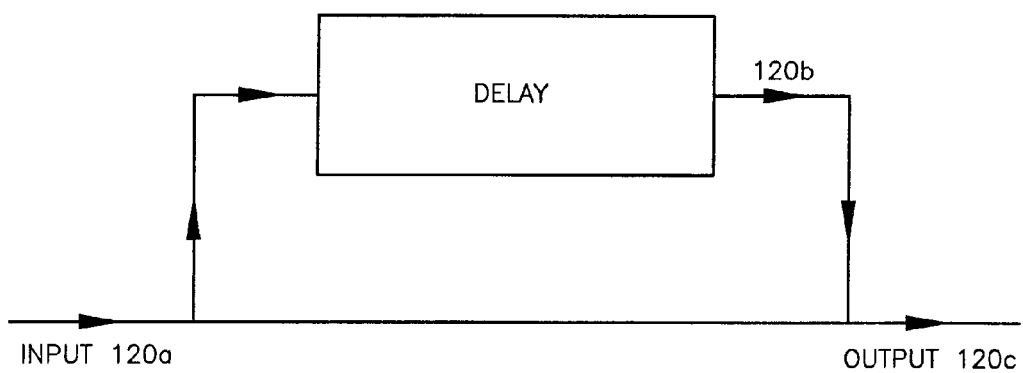
FIG. 4 shows a block diagram of a system for canceling a wave of known wavelength.

This ground clutter can be eliminated by the use of cancellation, a technique well known in the art. FIG. 4 shows a simplified block diagram of the method. The received signal 120*a* from the antenna is split (bifurcated) with half going through a delay 120*b*, and then recombined. This delay is equal to, for example, a half-wavelength phase delay. Thus, if the reflected microwave signal is stationary, i.e., at time t is exactly the same in terms of amplitude and phase as the signal at time t−1 delay, then the signal is cancelled, because the two components are 180 degrees out of phase, and there is no substantial output 120*c*. The delay can also be any odd multiple of n/2 phase delay. It is understood that this cancellation technique may be provided in known manner by advanced analog or digital electronic systems, and therefore need not be provided as a simple delay line summer.

As shown in FIG. 5, as the Stealth Craft transverses the detection zone, the clutter cancellation will make the ground "dark", i.e., all microwaves from the ground will be cancelled. The Stealth Craft will, itself, reflect no microwave, so that it will also be "dark".

However, the delay is selected such that as the Stealth Craft transverses the detection zone, the edge of the Stealth Craft will be shown as a "white" edge, i.e., all microwave energy reflected will be cancelled, except that at the edge of the craft. As shown in FIG. 5 the microwave at the leading edge of the craft will not be cancelled because the current signal reflected from the ground is blocked but the previous (delayed) reflected signal from the ground was not blocked by the craft so it is not cancelled by the current signal.

Thus, the leading and trailing edges of the craft will be the only areas where the microwave will not be either blocked or cancelled. While this technique is subject to noise limitations, the precision may be improved by correlating leading and trailing edge detections, which should be spaced in time according to the size and speed of the craft. The transverse distance the Stealth Craft moves during each pulse determines the "width" of the leading edge of the Stealth Craft. At a speed of 1 KM/sec., the Craft would move 1/300 KM during a 1/300-second pulse interval, thus the leading edge would be about 3.3 meter.

When a Stealth Craft is detected, another option is to freeze the background cancellation, i.e., to cancel with the same (pre-stealth craft detection) background as long as the Stealth Craft is being detected, such as with a analog amplitude adjusted phase lock loop or digital background cancellation. This results in the craft (actually the silhouette of the craft) being entirely "white" (microwave source) as shown in the FIG. 6. The result is similar to the correlation of leading and trailing edges, since noise considerations will make higher level processing for consistency and conformance with reasonable windows desirable.

In addition to detecting the silhouette of a Stealth Craft against a microwave source, another method of detecting a Stealth Craft is to detect the shadow the Stealth Craft makes on a reflecting surface, such as the Earth.

As in detecting a silhouette, the attenuation of the Microwave by the Stealth Craft is to be detected. Thus results in a "dark" area on a "white" (reflecting) surface.

As with detection of a silhouette, background cancellation may be used to cancel the background and make the shadow "white", so that a "white" patch on a "dark" background is sought. In this case, a moving average cancellation technique may be employed, for example with a time constant of about 15 seconds. In this case, as a Stealth Craft enters the aperture, the change against the background will be apparent, yet changes in the background over a slower time-course will be compensated. Alternately, an adaptive cancellation system may be implemented, which may, for example, halt adaptation during the period of detection of an event, to provide maximum "contrast" of the event. Other, more complex filtering algorithms may also be employed. In any case, as a Stealth Craft is being detected, then the shadow of the stealth craft becomes "white" (microwave source) and the non-shadow background becomes "dark" (no microwave) as shown in FIG. 7.

As discussed above, the negative Radar technique works for non-stealth craft, as well as for stealth craft. This is important because it may not be determined, a priori, if a craft being detected is a stealth craft or non-stealth craft, and thus a single detection system, compatible with both types of craft, may be desired.

An electronic picket fence can be established such that the craft transmitting the microwave is a satellite, high-flying aircraft, or High Altitude Long Endurance (HALE) craft and the receiver is on a second craft that is passively receiving the microwaves, without itself transmitting any microwave signal. The transmitter could be, for example, a phased array Radar sweeping a beam, creating a series of electronic picket fences.

Figure 8:
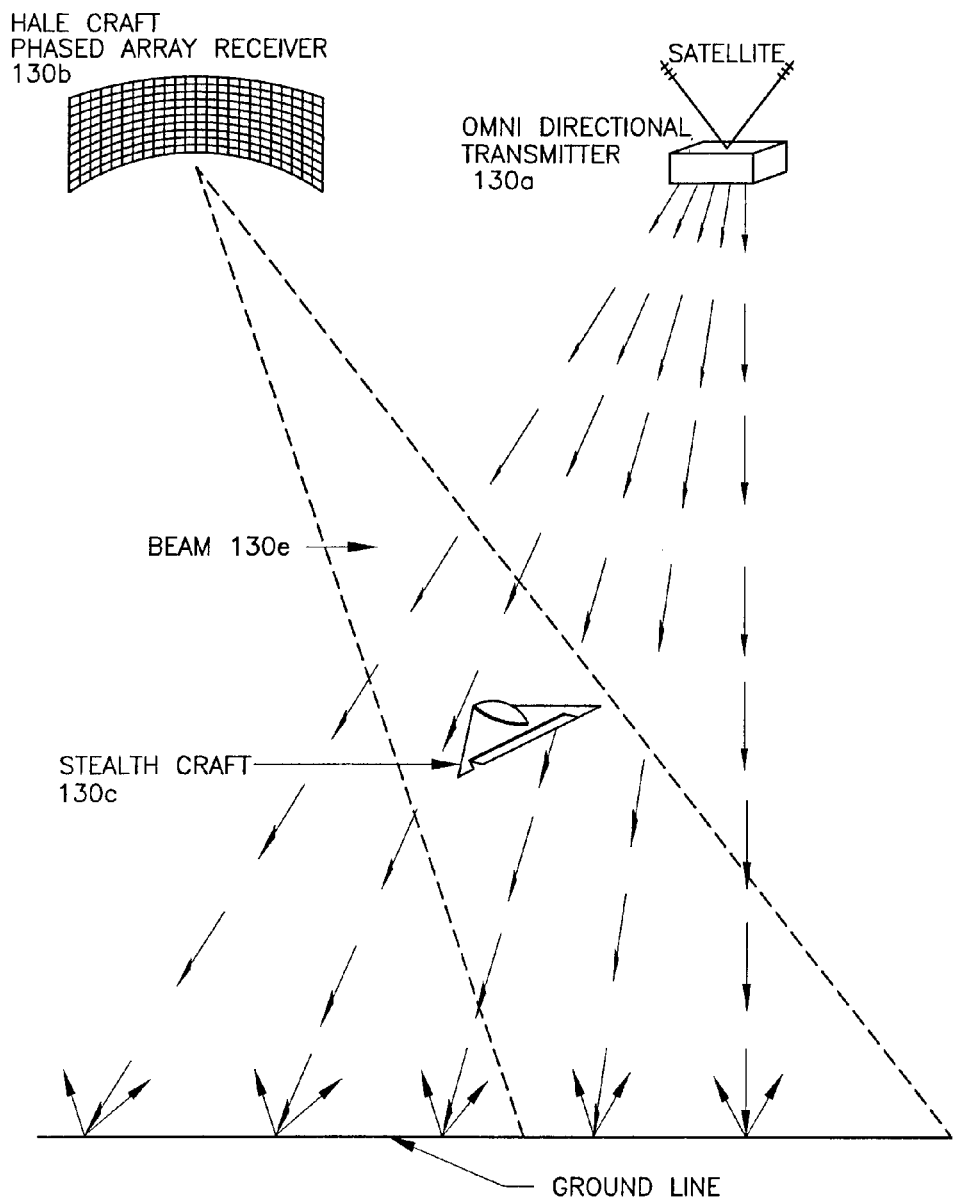
FIG. 8 shows a perspective view of a system for detecting stealth craft with omni-directional transmitter and separate receiver.

As shown in FIG. 8, in constructing electronic picket fences, the transmitter 130*a* can be omni-directional, i.e., the transmitter could transmit in all directions, with the receiver 130*b* being a phased array antenna creating sweeping "beams", one beam 130*e* of which could detect Stealth Craft 130*c*. For example, one transmitter on a satellite, aircraft, or High Altitude Long Endurance (HALE) craft could be used by a plurality of receivers to construct a plurality of picket fences.

Thus, the detecting craft can itself be a Stealth Craft, and the system operational without transmitting any microwaves that could be used to detect it, or used by, e.g., a radar-seeking missile (such as HARM), to destroy it.

A satellite used to illuminate the object need not be a cooperating satellite. There are many commercial, government, and military satellites in orbit. For example, a direct broadcast TV satellite or a geopositioning (e.g., GPS or GLONASS) satellite could be used, without the cooperation of the satellite owner, as long as the microwave carrier wavelength and ground coverage are appropriate. Stability and predictability of the carrier may also be important. As of 1998, there were 220 communication satellites in orbit. Between 1998 and 2003, this is expected to grow to over 1000 satellites, with the orbiting of new fleets of satellites for satellite based cellular telephone service, which are often referred to as personal communication satellites. Some of these satellites will be in low-Earth orbit or mid-Earth orbit, and others will be in geosynchronous orbit.

If two detecting craft detect the Stealth Craft, the distance to the Stealth Craft could be determined by the previously mentioned method of triangulation.

Figure 9:
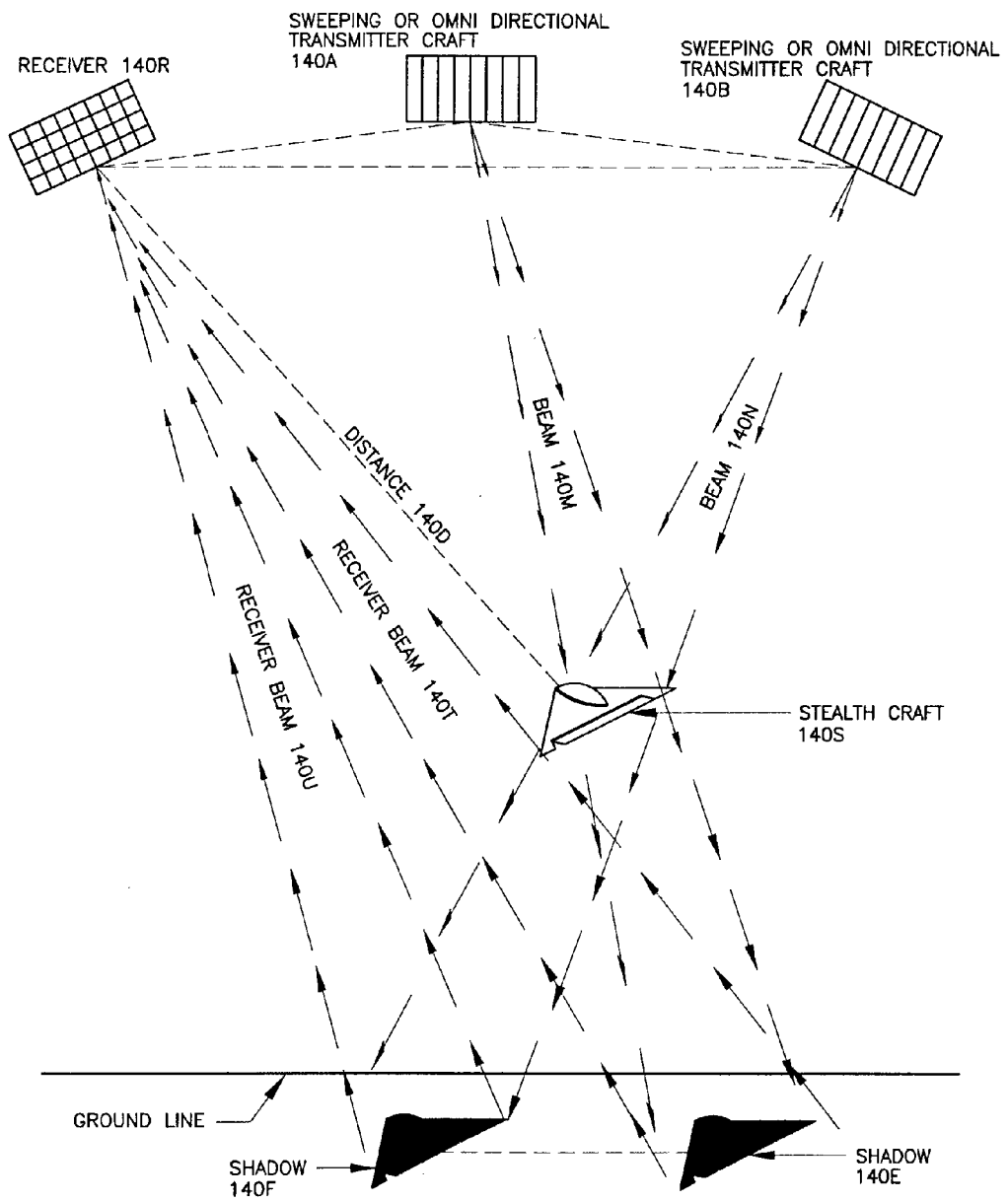
FIG. 9 shows a perspective view of a system for detection and distance determination with two transmitters and a separate receiver using shadows.

If there is one detecting craft but two or more transmitting sources, as shown in FIG. 9, a different method of triangulation can be used to determine the distance from the detecting craft to the Stealth Craft. The shadow of the Stealth Craft 140*s* on the ground may be detected, i.e., the area 140*e* on the ground in which the Microwave beam 140*m* from the transmitting Craft 140*a* was partially or fully attenuated or blocked by the Stealth Craft 140S at time T is detected. The area 140*f* on the ground in which the Microwave beam 140*n* from the transmitting Craft 140*b* is partially or fully attenuated or blocked by the same Stealth Craft 140S at the same time T is detected.

The transmitted beams 140*m* and 140*n* reflect off the ground, and by use of a phased array receiver, having narrow beam input sensitivity, i.e., directional receiving, with two simultaneous "beams" 140*t* and 140*u*, the shadow of the Stealth Craft for beam 140*m* and the shadow for beam 140*n* may be detected.

Since the location of transmitters 140*a*, and 140*b*, and shadows 140*e* and 140*f*, and receiver "beams" 140*t* and 140*u* and the receiver 140*r* are known for the time of receipt, simple geometric techniques, well known in the art, can be used to determine the distance 140*d* from receiver 140*r* to Stealth Craft 140*s*.

Figure 10:
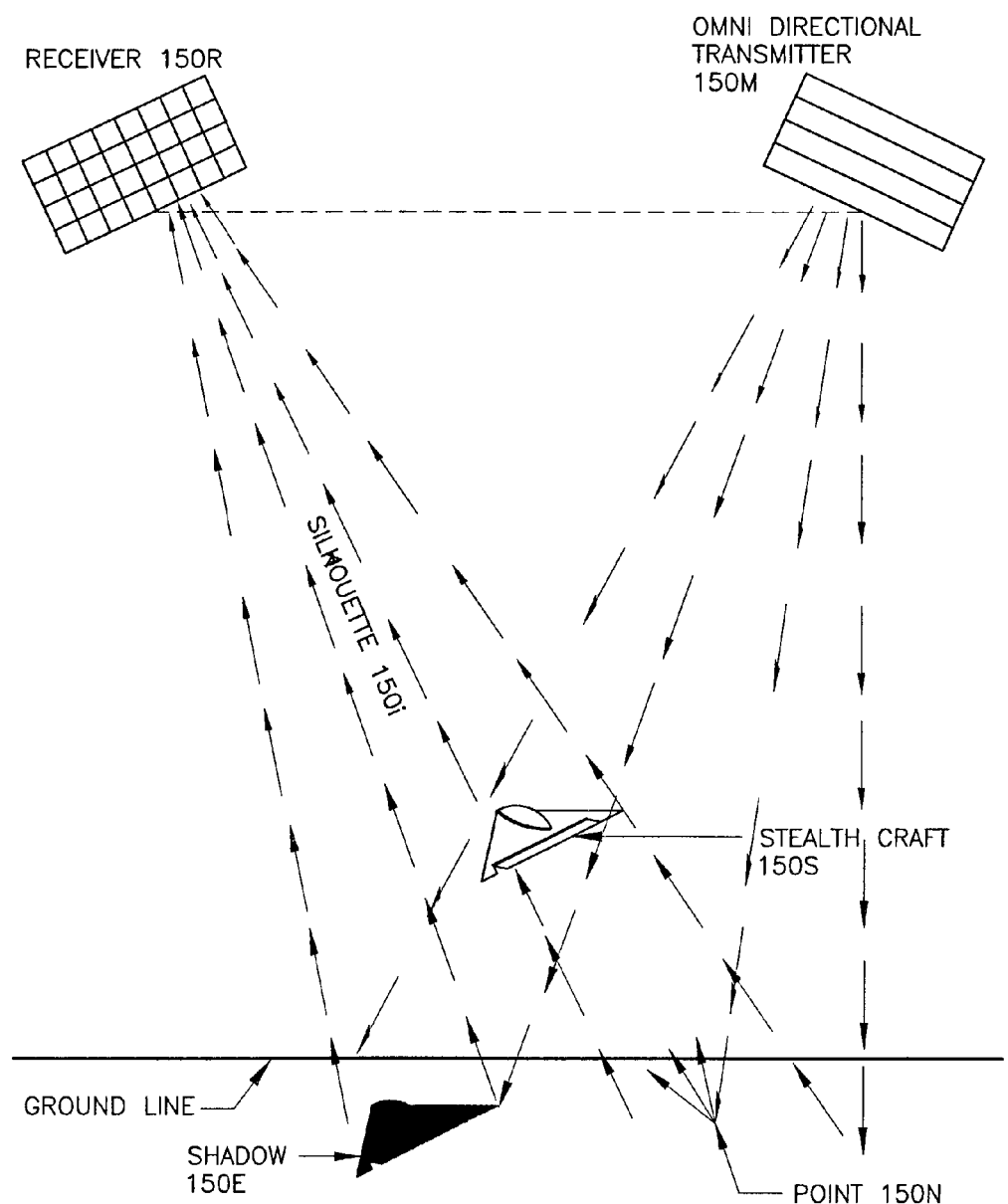
FIG. 10 shows a perspective view of a system for detection and distance determination with one transmitter and a separate receiver using both silhouette and shadow.

If there is only one transmitter and one receiver, and they are spatially separated, yet another method of triangulation can be used to determine the distance to the Stealth Craft. As shown in FIG. 10, for an omni-directional Microwave transmitter 150*m*, and a receiver 150*r*, the shadow 150*e* of the Stealth Craft 150*s* on the ground, as well as the silhouette 150*i* of the Stealth Craft 150*s* against the reflected Microwave at point 150*n* is detected. Since the various locations of 150*m*, 150*r*, 150*e* and 150*n* are known for the time of detection, geometric methods, well known in the art, can be used to find the distance from the receiver 150*r* to the Stealth Craft 150*s*.

If either standard triangulation or the triangulation methods shown in FIG. 9 or 10 are used in conjunction with non-cooperating satellites, such as geosynchronous Direct Broadcast TV satellites, then controlled active emission sources, e.g., radar transceivers, would not be required to detect and determine the distance to Stealth Craft. All that would be required with these types of sources are a receiver, a phased array antenna, and an appropriate processor. The phased array antenna is controlled to have sensitivity to microwaves in a "band", and possibly multiple simultaneous bands. The frequencies and transmitting characteristics of many satellites are known and published, so shadows and silhouettes at the same frequency of the satellite may be detected and distinguished. In the case of commercial transmissions, techniques may be necessary to distinguish multiple sources of radiation in the same band. For example, typically, the emission from such satellites will be coherent and modulated. Upon reflection, the radiation will be scattered, because the Earth is an imperfect reflector. However, some coherency as well as the modulation pattern, may be retained. Therefore, a selective filter for the presumed reflected wave may be implemented, filtering out other sources of potentially interfering electromagnetic information. In this case, it is presumed that the Craft to be detected will interfere with the pass filtered wave portion, however, this presumption appears warranted based on the physics of shadow and silhouette formation by a Stealth Craft. Thus, the frequency channel, modulation pattern, and propagation vectors of the satellite transmission may all be used to distinguish from other sources of electromagnetic radiation.

It should be understood that the craft holding the receiver antenna in this case has access to receive a clean representation of the satellite transmission from above, thereby allowing homodyne-type detection and/or the use of phase locked loops.

Figure 11:
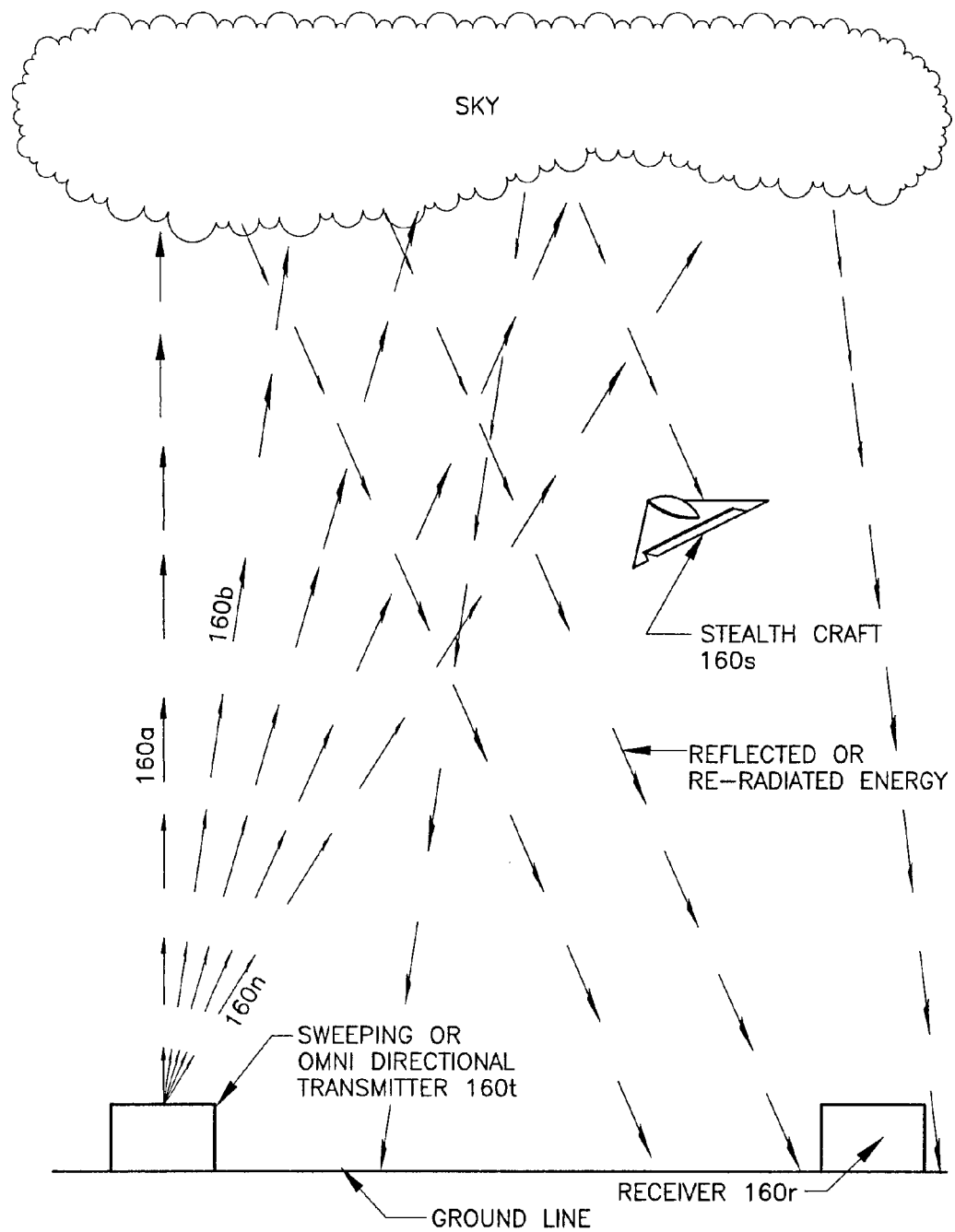
FIG. 11 shows a perspective view of a system for detecting stealth craft using the Earth's atmosphere to reflect radiation.

In an active detection system, there is a transmitted beam and a detected reflected beam. As shown in FIG. 11, instead of a craft directing a beam to reflect off the Earth, the beams 160*a*, 160*b*,-160*n*, could be directed from the Earth or from a craft via a sweeping or omni-directional transmitter 160*t* toward the sky, with the microwaves reflected from the sky, to the receiver 160*r*. The amount of reflection and nature of the reflection depends on the nature of the beams, and the vagaries of atmospheric reflection, such as particulates, ice crystals, and the like. In addition, the atmosphere can absorb energy and re-radiate it.

Passive Detection

In a passive detection system, no energy is intentionally directed to the target. Instead, the silhouette (or attenuation of the microwave) of the Stealth Craft against an existing energy background, such as the cosmic background radiation in the sky, or the infrared energy emitted by the Earth, is detected.

The cosmic background radiation is an omnipresent microwave source, and is the same in any direction up to 1 part in 100,000. The cosmic background radiation is equivalent to the radiation emitted by a black body at 2.7 degrees Kevin (−270 Centigrade).

The Earth can also be considered a black body, or a gray body, at the temperature of the Earth's surface. The radiation emitted by a gray body depends on its temperature, its emissisity (determined primarily by its roughness) and its reflectivity.

This background energy is much weaker than that used in typical Radar systems. While an x-band Radar has a typical power (brightness) of 4800 watts/meter squared/Hz/steradian, a typical Earth brightness might be $5.4 \times 10^{-24}$, in the same microwave frequency range.

Therefore, specialized receivers called Radiometers are used to measure the brightness of background radiation from thermal sources. A bolometer (or superconducting bolometer) may also be used to detect Earth background radiation.

The background radiation is examined to look for either the silhouette of the Stealth Craft or the attenuation of the background that is caused by the Stealth Craft. The Stealth Craft itself can be considered a gray body, but since it is coated with Microwave absorbing material, it should not reflect much microwave nor should it emit much microwave energy. Thus, passive detection of a Stealth Craft against the cosmic background radiation may be more effective for Stealth Craft than non-Stealth Craft.

In addition to detecting Stealth craft, another advantage of passive Negative Radar over conventional Radar is that the detector can be a device that transmits or emanates no microwave radiation. This makes it much harder for the enemy to find and destroy, with e.g., the use of a microwave seeking missile.

If the weak cosmic background radiation is used, a very sensitive receiver, cooled to close to absolute zero (−273 degrees Centigrade) could be used, which is sensitive to this wavelength of radiation. The Cosmic Background Explorer satellite used differential microwave radiometers to look for anisotropy of 1 part in 100,000 in the cosmic microwave background radiation. The NASA Microwave Anisotropy Probe satellite, to be launched in 2000, will also be able to detect anisotropy of 1 part in 100,000. Therefore, systems that analyze spatial variations in this radiation are well known.

The apparatus according to the present invention will look, at any given time, at a small enough piece of the sky so that a Stealth Craft will cause an attenuation of at least $\frac{1}{100,000}$ in the strength of the cosmic background radiation. This will be achieved by insuring that the area (pixel) of the sky being observed at any instance is no more than 100,000 times the size of the Stealth Craft to be detected.

For example, the F117a stealth fighter, with a length 60 feet and height of 12 feet, has a cross section of 720 square feet. Thus, (72,000,000 square feet of sky (720*100,000) (about three square miles) around the craft (at the distance of the craft) could be observed at any given instance, and the craft would obscure $\frac{1}{100,000}$ of the cosmic background radiation. The detection system would therefore compare the strength of microwaves at the time of detection (time X) to a previous time (time X−1) for that pixel.

Figure 12:
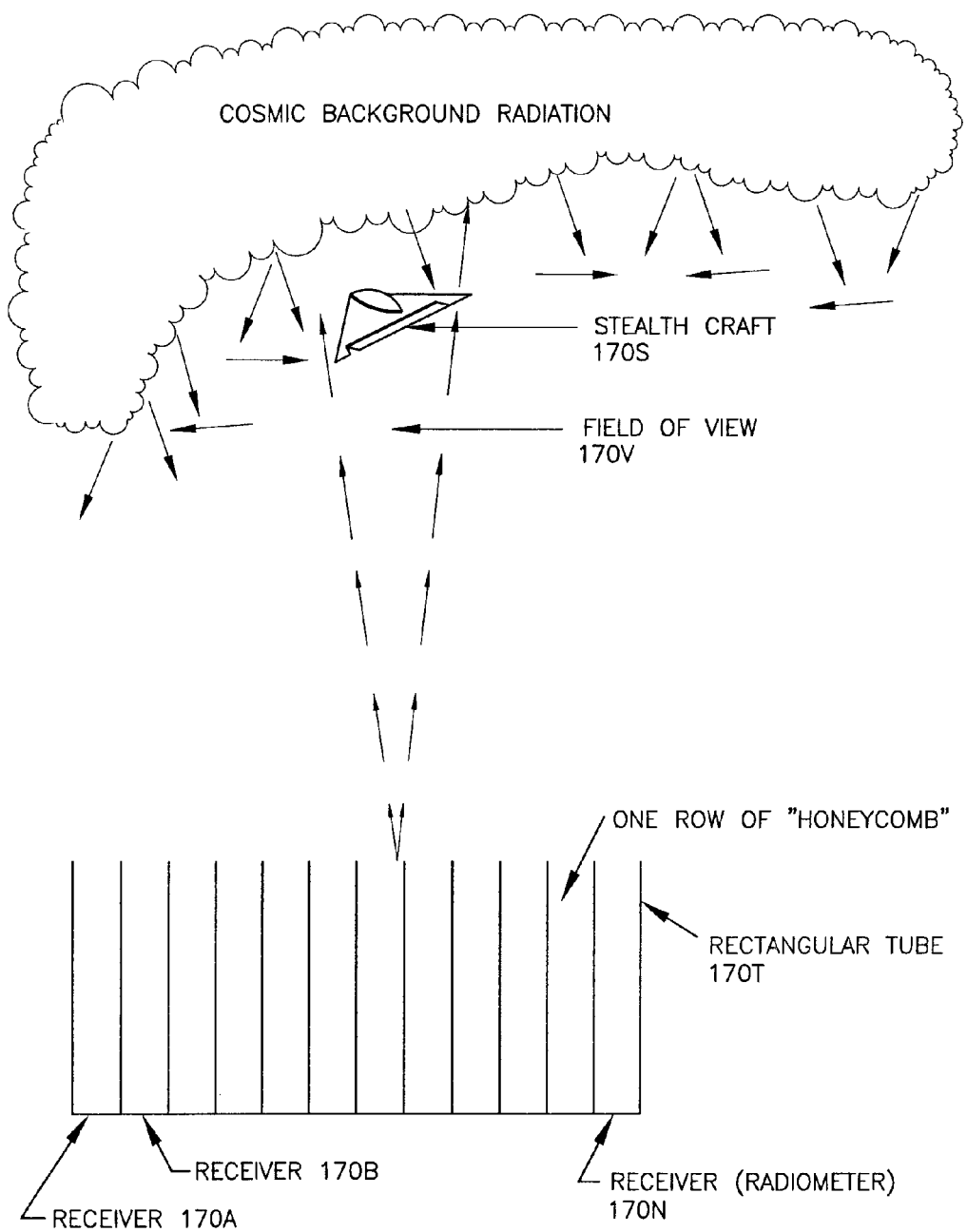
FIG. 12 shows a perspective view of a system for detecting stealth craft using cosmic background radiation.

As shown in FIG. 12, the attenuation of the microwave signal that results from the passage of a Stealth craft 170s in the field of view 170v of a receiver or radiometer 170n is measured.

There are various ways to insure that the area of the sky being observed is no more than 100,000 times the size of a Stealth Craft. For example, if thousands of receivers are used, each can observe a small pixel of the sky. Alternately, one receiver (radiometer) could be rapidly swept, sequentially sensitive to different small regions (pixels) of the sky.

A cosmic background radiation-based system must be directed away from Earth, and is typically limited to coverage of a radius of 50-100 miles, with a height window of 0.5-20 miles. With a 0.5 square mile pixel area at maximum range, $(2 \times 100 \times \pi \times 20/0.5)$ 24,000 pixels would be required. This may be provided, for example, as a rotationally moving scanner with a 64×64 array of detector elements, or as multiple stationary arrays each looking in a somewhat different direction.

As shown in FIG. 12, if a plurality of receivers or radiometers 170a, 170b, 170n are used, the assembly of receivers could have a honeycomb appearance. To limit the aperture of each receiver to the microwave radiation from a small patch (pixel) of the sky, a tube 170t (e.g., rectangular, hexagonal, etc.) is placed above each receiver. The inside diameter of the tube and length (assuming the inside of the tube does not reflect Microwave) of the tube determines the field of view (pixel of the sky) that is seen by each receiver element. The rectangular tube can be coated on the inside with known materials so that the inside of the tube will not reflect Microwave.

To allow for the use of a less sensitive receiver, a plurality of tubes can be pointed to one field of view. The microwave signal from all of the tubes could then be combined to form a stronger signal that could be detected by a less sensitive (and perhaps less costly) receiver.

Because of the weakness of cosmic background radiation, and attenuation of the microwaves by Earth's atmosphere, in particular the water vapor in the atmosphere, the use of cosmic background microwave will be most effective when the receiver (radiometer) is in a high flying aircraft, HALE craft, or satellite, and the craft being searched for is a high flying stealth aircraft, stealth HALE craft, or stealth satellite.

Another background radiation source that can be used is the Earth itself. As mentioned above, the Earth can also be considered a black body, or a gray body, at the temperature of the Earth's surface or about 300 degrees K. For example, an infrared receiver on a detecting craft can look at small areas (pixels) of the ground at sequential times, for detecting the attenuation of the infrared radiation produced by a Stealth Craft obscuring part of the radiation from the ground pixel. Since the wavelength corresponding to 300 degrees K is in the infrared range, the normal microwave stealth techniques do not obscure in this wavelength. The skin temperature of the stealth craft is not likely to closely correspond to the ground temperature of the earth below. Thus, the craft will produce a contrast.

Determination of Distance to Target

Figure 13:
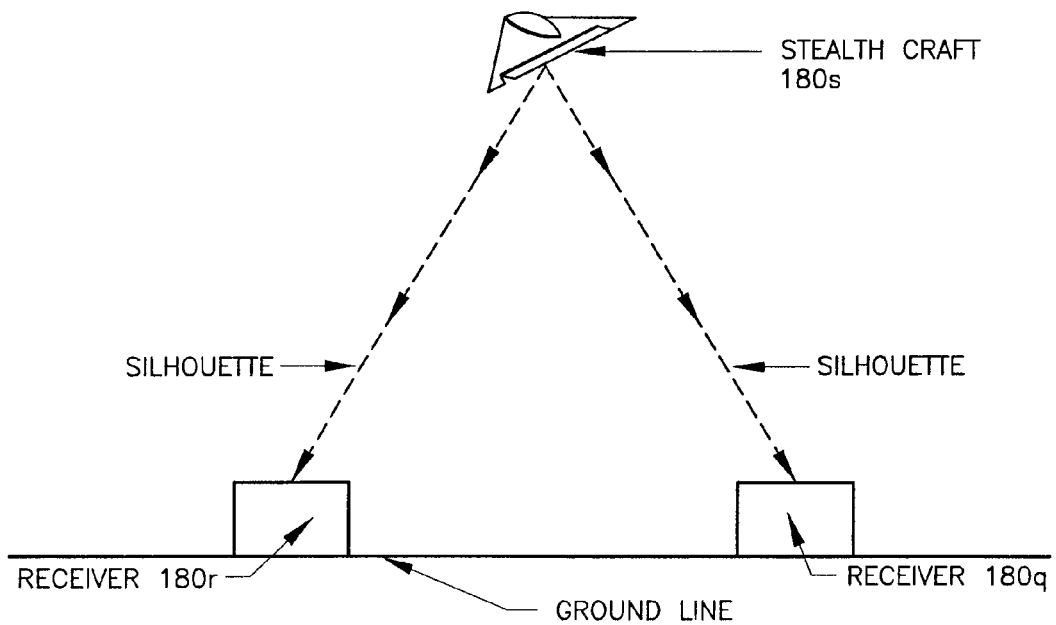
FIG. 13 shows a perspective view of a system for determining distance with cosmic background radiation.

As shown in FIG. 13, the well-known method of triangulation or parallax can be used to determine the distance. This method requires two detectors. The Stealth Craft 180s is detected by receiver 180r and by receiver 180q. Since the location of receivers 180r and 180q are known at the time of detection, geometric methods, well known in the art, can be used to calculate the location of Stealth Craft S and the distance to same.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

The term "comprising", as used herein, shall be interpreted as including, but not limited to inclusion of other elements not inconsistent with the structures and/or functions of the other elements recited.

What is claimed is:

1. A method for processing a signal, comprising:
    transmitting modulated radio frequency electromagnetic radiation propagating along at least one off axis path with respect to a receiver toward a scattering medium;
    scattering the modulated radio frequency electromagnetic radiation with the scattering medium;
    receiving the scattered modulated radio frequency electromagnetic radiation at the receiver, wherein the receiver has a plurality of receiving antennas, each receiving a respective distinct scattered modulated radio frequency electromagnetic radiation signal;
    determining a respective time delay associated with the received scattered modulated radio frequency electromagnetic radiation signals with at least one correlator; and
    determining expected characteristics of the respective scattered modulated radio frequency electromagnetic radiation signals at the receiver.

2. The method according to claim 1, wherein the at least one off axis path comprises a plurality of off axis paths.

3. The method according to claim 1, further comprising analyzing the respective received scattered modulated radio frequency electromagnetic radiation signals for changes in characteristics from the determined expected characteristics.

4. The method according to claim 1, further comprising performing an adaptive background analysis.

5. The method according to claim 1, wherein the time delay corresponds to a physical distance.

6. The method according to claim 1, wherein the scattering medium comprises a moving object.

7. The method of claim 1, wherein the received respective distinct scattered modulated radio frequency electromagnetic radiation signals are selectively attenuated in dependence on the scattering medium, and the receiver processes the received respective distinct scattered modulated radio frequency electromagnetic radiation signals in an attenuation-dependent manner.

8. A method for distinguishing scattered radiation, comprising:
    transmitting at least one coherent modulated radio frequency electromagnetic radiation signal, propagating along at least one off axis path with respect to a receiver having a plurality of antennas, toward a scattering medium;
    scattering the at least one coherent modulated radio frequency electromagnetic radiation signal with the scattering medium;
    receiving a plurality of modulated scattered radio frequency electromagnetic radiation signals through the plurality of antennas, each receiving antenna receiving a distinct scattered radio frequency modulated electromagnetic radiation signal, derived from the at least one coherent modulated radio frequency electromagnetic radiation signal, at the receiver;
    correlating the plurality of received modulated scattered radio frequency electromagnetic radiation signals to determine at least one time delay associated with the received plurality of modulated scattered radio frequency electromagnetic radiation signals; and
    determining expected characteristics of the plurality of modulated scattered radio frequency electromagnetic radiation signals at the receiver.

9. The method according to claim 8, wherein the at least one off axis path comprises a plurality of off axis paths, generated by a plurality of transmit antennas.

10. The method according to claim 8, further comprising analyzing the received plurality of modulated scattered radio frequency electromagnetic radiation signals for changes in characteristics from the determined expected characteristics.

11. The method according to claim 8, wherein the received plurality of distinct scattered radio frequency modulated electromagnetic radiation signals are selectively attenuated in dependence on the scattering medium, and the receiver processes the received plurality of scattered modulated radio frequency electromagnetic radiation in an attenuation-dependent manner.

12. The method according to claim 8, further comprising performing an adaptive background analysis.

13. The method according to claim 8, wherein the time delay corresponds to a physical distance.

14. The method according to claim 8, wherein the scattering medium comprises a moving object.

15. A receiver for processing a signal, comprising:
    plurality of receiving antennas, each receiving antenna being configured to receive a distinct scattered modulated radio frequency electromagnetic radiation signal propagating off-axis with respect to a source of the modulated radio frequency electromagnetic radiation, from a scattering medium;
    an input configured to receive an output from each respective antenna corresponding to the distinct scattered modulated radio frequency electromagnetic radiation signals; and
    at least one processor configured to correlate at least two outputs from respective antennas to estimate a time delay associated with the received scattered modulated radio frequency electromagnetic radiation represented in the outputs from the respective antennas, to determine expected characteristics of the scattered modulated radio frequency electromagnetic radiation.

16. The receiver according to claim 15, wherein each of the plurality of antennas receives a distinct scattered modulated radio frequency electromagnetic radiation signal corresponding to a respective one of a plurality of off axis paths.

17. The receiver according to claim 15, wherein the at least one processor is further configured to perform an adaptive background analysis and to determine changes in the expected characteristics over time.

18. The receiver according to claim 15, wherein the time delay corresponds to a physical distance.

19. The receiver according to claim 15, wherein the received distinct scattered modulated radio frequency electromagnetic radiation signals are selectively attenuated in dependence on the scattering medium, and the at least one processor is further configured to process the received distinct scattered modulated radio frequency electromagnetic radiation signals in an attenuation-dependent manner.

20. The receiver according to claim 15, wherein the source of the modulated radio frequency electromagnetic radiation comprises a cooperating transmitter.

* * * * *